United States Patent [19]
Suzuki et al.

[11] Patent Number: 5,477,260
[45] Date of Patent: Dec. 19, 1995

[54] APPARATUS FOR REDUCING A LEVEL DIFFERENCE BETWEEN IMAGE SIGNALS

[75] Inventors: Masao Suzuki, Tokyo; Tsutomu Takayama, Kawasaki; Masashi Hori, Yokohama, all of Japan

[73] Assignee: Canon Kabushiki Kaisha, Tokyo, Japan

[21] Appl. No.: 22,198

[22] Filed: Feb. 25, 1993

[30] Foreign Application Priority Data

Feb. 28, 1992 [JP] Japan .................................. 4-075776
Jun. 26, 1992 [JP] Japan .................................. 4-169105

[51] Int. Cl.⁶ .................................................. H04N 9/73
[52] U.S. Cl. ................................... 348/257; 348/694
[58] Field of Search .................................. 358/171, 148, 358/160, 34, 35, 29 C, 41, 17; 348/257, 692, 694; H04N 9/73

[56] References Cited

U.S. PATENT DOCUMENTS

| | | | |
|---|---|---|---|
| 3,819,954 | 6/1974 | Butler | 307/221 D |
| 4,525,737 | 6/1985 | Hashimoto et al. | 358/44 |
| 4,884,129 | 11/1989 | Ozawa et al. | 348/257 |
| 4,943,857 | 7/1990 | Izuno et al. | 358/148 |
| 4,972,262 | 11/1990 | Nichols | 358/160 |
| 5,272,328 | 12/1993 | Furukawa | 348/257 |
| 5,319,450 | 6/1994 | Tamayama et al. | 348/692 |

Primary Examiner—James J. Groody
Assistant Examiner—Jeffrey S. Murrell
Attorney, Agent, or Firm—Fitzpatrick, Cella, Harper & Scinto

[57] ABSTRACT

An object of this invention is to reduce level differences and errors in a luminance signal and color difference signals. In order to achieve the above object, an image pickup apparatus has an image sensor for photoelectrically converting an object image and a plurality of delay lines for delaying a video signal by one horizontal period, so that a video signal derived from an output including a clock leakage component from the image sensor is input to the plurality of delay lines, including an adjustment unit for adjusting the signal level of the video signal at an input or output of at least one of the plurality of delay lines.

17 Claims, 26 Drawing Sheets

FIG. 1
PRIOR ART
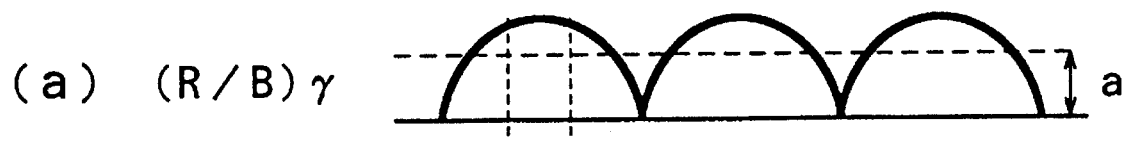
(a) (R/B)γ
1H DL SAMPLING PULSE (R/B)γ
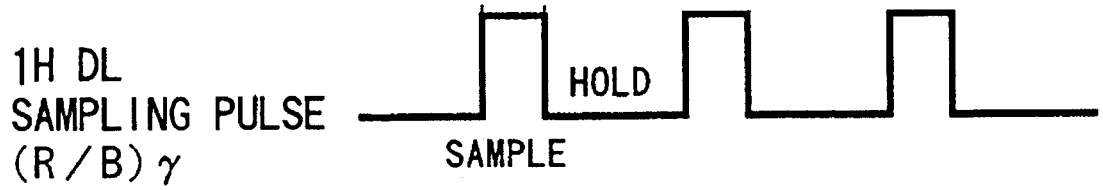
(b) (G)γ
1H DL SAMPLING PULSE (G)γ
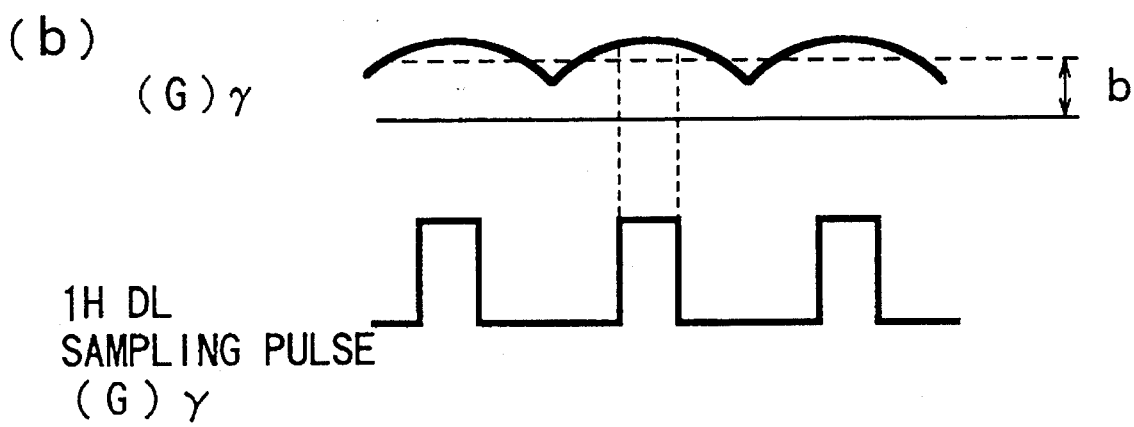
(c) (R/B)1H
(d) (G)1H

FIG. 8
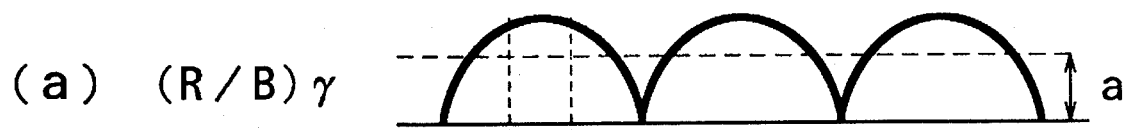
(a) (R/B)γ
1H DL
SAMPLING PULSE
(R/B)γ
SAMPLE   HOLD
(b) (G)γ
1H DL
SAMPLING PULSE
(G)γ
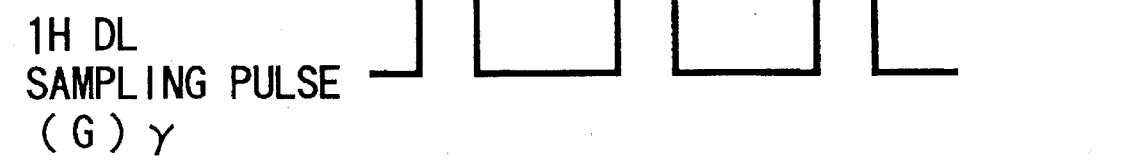
(c) (R/B)1H
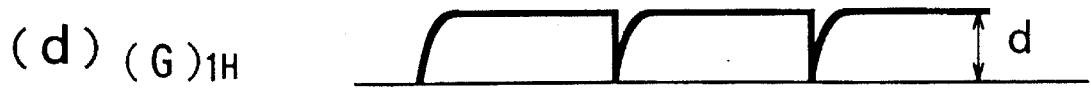
(d) (G)1H

FIG.15
(a) R/B 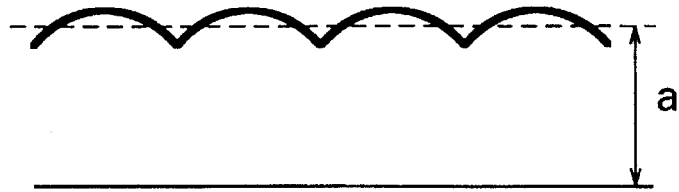 a
(b) G 
(c) CLOCK 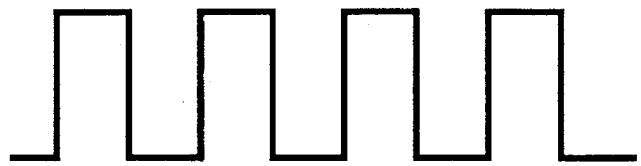
(d) TRIANGULAR WAVE 
(e) SIGNAL AFTER FILTERING 
(f) (R/B)' 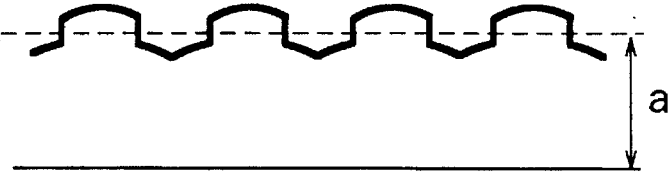 a

APPARATUS FOR REDUCING A LEVEL DIFFERENCE BETWEEN IMAGE SIGNALS

BACKGROUND OF THE INVENTION

The present invention relates to an image pickup apparatus and, more particularly, to an image pickup apparatus to be used upon being connected with a magnetic recording apparatus or monitor.

In conventional signal processing of an image pickup apparatus, a video signal (R/B and G signals) and a signal obtained by delaying this video signal by one horizontal (1H) period are input to a matrix processing circuit to obtain a luminance signal (Y) and color difference signals (R-Y and B-Y).

In this image pickup apparatus, to prevent MTF degradation, a low-pass filter is not arranged, and a video signal is delayed by one horizontal period by means of a delay means (e.g., a CCD drive type delay line, 1 HDL) without eliminating a clock component. The delayed signal is input to the matrix processing circuit. A clock component of the signal input to the delay means and a clock for driving the delay means are synchronized, as shown in FIGS. 1(a) to 1(d). The clock component (clock leakage amount) of the signal input to this delay means may be adversely affected by a preprocessing circuit and IC characteristics and may become a different clock component.

More specifically, the different clock components are exemplified as an R/B signal having a large magnitude shown in FIG. 1(a) and a G signal having a small magnitude shown in FIG. 1(b).

In this case, the levels of the R/B and G signals are detected as average value levels including the clock components (levels a and b in FIGS. 1(a) and 1(b). However, as the output from the delay means, the level at the phase of each sampling pulse becomes the output signal level. Therefore, the levels at the phases of the respective sampling pulses are detected as levels c and d in FIGS. 1(c) and 1(d), respectively.

Even if the levels of the R/B and G signals prior to the input to the delay means are set at the black level (non-signal level) (a=b), outputs from the delay means have a difference in black level (c≠d). For this reason, errors occur in the Y, R-Y, and B-Y levels in the non-signal state, and a level difference occurs every 1H (first problem).

In the conventional image pickup apparatus, in order to obtain the luminance signal Y, the video signal (R/B and G signals) and the signal obtained by delaying this video signal by one horizontal period are added, and the added R/B and G signals are selectively output by a switching means. An LPF (Low-Pass Filter) for eliminating a leakage component of a CCD transfer pulse is arranged at the output of the CCD in the CCD 1H (horizontal scanning period) delay line used in the conventional image pickup apparatus. An 1H delay amount is obtained together with the delay amount of the LPF.

In the conventional delay line, however, since the delay amount of the LPF is included, a signal accurately delayed by 1H cannot be obtained.

If a color filter used in the CCD image sensor is constituted by G (green) stripes and R (red)/B (blue) line sequential arrangements, as shown in FIG. 2, a 1H delay line is required to generate a luminance signal by switching. Assume that output signals from the 1H delay line and the LPF connected to the 1H delay line when signals input to the 1H delay line are G(0) and R(0) shown in a timing chart of FIG. 3 are defined as G (−1) and B(−1), respectively. If the delay amount of the LPF has a correlation with gate pulses SWG and SWRB for the input signals G(0) and R(0) and a luminance signal SW-Y, as shown in the timing chart of FIG. 3, the SW-Y (luminance) output signal contains information of two pixels of the 1H delay line output by one switching operation, as shown in FIG. 3. For this reason, the resolution in the horizontal direction is degraded. At the same time, image degradation in the form of a moiré is caused when the luminance signal Y is output (second problem).

SUMMARY OF THE INVENTION

The present invention has been made in consideration of the above situation, and has as its object to provide an image pickup apparatus in which errors do not occur in Y, R-Y, and B-Y levels.

It is another object of the present invention to provide an image pickup apparatus having a delay unit capable of stably obtaining a predetermined delay amount, e.g., 1H.

In order to solve the conventional problems described above and achieve the above objects according to the first aspect of the present invention, an image sensor is characterized by the following arrangement.

That is, the image sensor comprises an image pickup means for photoelectrically converting an object image into a video signal and a plurality of delay means each for delaying the video signal by a predetermined period, wherein the video signal includes a clock leakage component, characterized by adjusting means for adjusting a relative signal level between video signals delayed by the plurality of delay means.

An image pickup apparatus according to the second aspect of the present invention is characterized by the following arrangement.

That is, an image pickup apparatus comprises an image pickup means for photoelectrically converting an object image into a video signal and a plurality of delay means each for delaying the video signal by a predetermined period, wherein the video signal includes a clock leakage component, characterized by correcting means for correcting the video signal by a clock signal having the same period and the same phase as those of the clock leakage component included in the video signal.

In addition, an image pickup apparatus according to the third aspect of the present invention is characterized by the following arrangement.

That is, an image pickup apparatus comprising delay means for delaying a video signal by a predetermined period, timing pulse generating means for generating a transfer clock for controlling a signal transfer timing of the delay means, operating means for operating the video signal and an output signal of the delay means, and switching means for selectively outputting an output signal of the operating means characterized by that the timing pulse generating means supplies a predetermined transfer clock to the delay means so that adjacent pixel signals do not overlap within a signal output period selected by the switching means.

Further, an image pickup apparatus according to the fourth aspect of the present invention is characterized by the following arrangement.

That is, an image pickup apparatus comprises a timing pulse generating means for supplying the delay means with a pulse train from which some pulses are omitted.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1(a) to 1(d) are waveform charts of signals for explaining a signal processing scheme of a conventional image pickup apparatus;

FIGS. 8(a) to 8(d) are timing charts for explaining an operation of the signal processing circuit in FIG. 4;

FIGS. 15(a) to 15(f) are waveform charts of signals for explaining an operation of the signal processing circuit of the sixth embodiment;

DETAILED DESCRIPTION OF THE PREFERRED EMBODIMENTS

Preferred embodiments of the present invention will be described in detail with reference to the accompanying drawings.

Embodiments for solving the first problem according to the present invention will be described below.

(First Embodiment)

Figure 4:
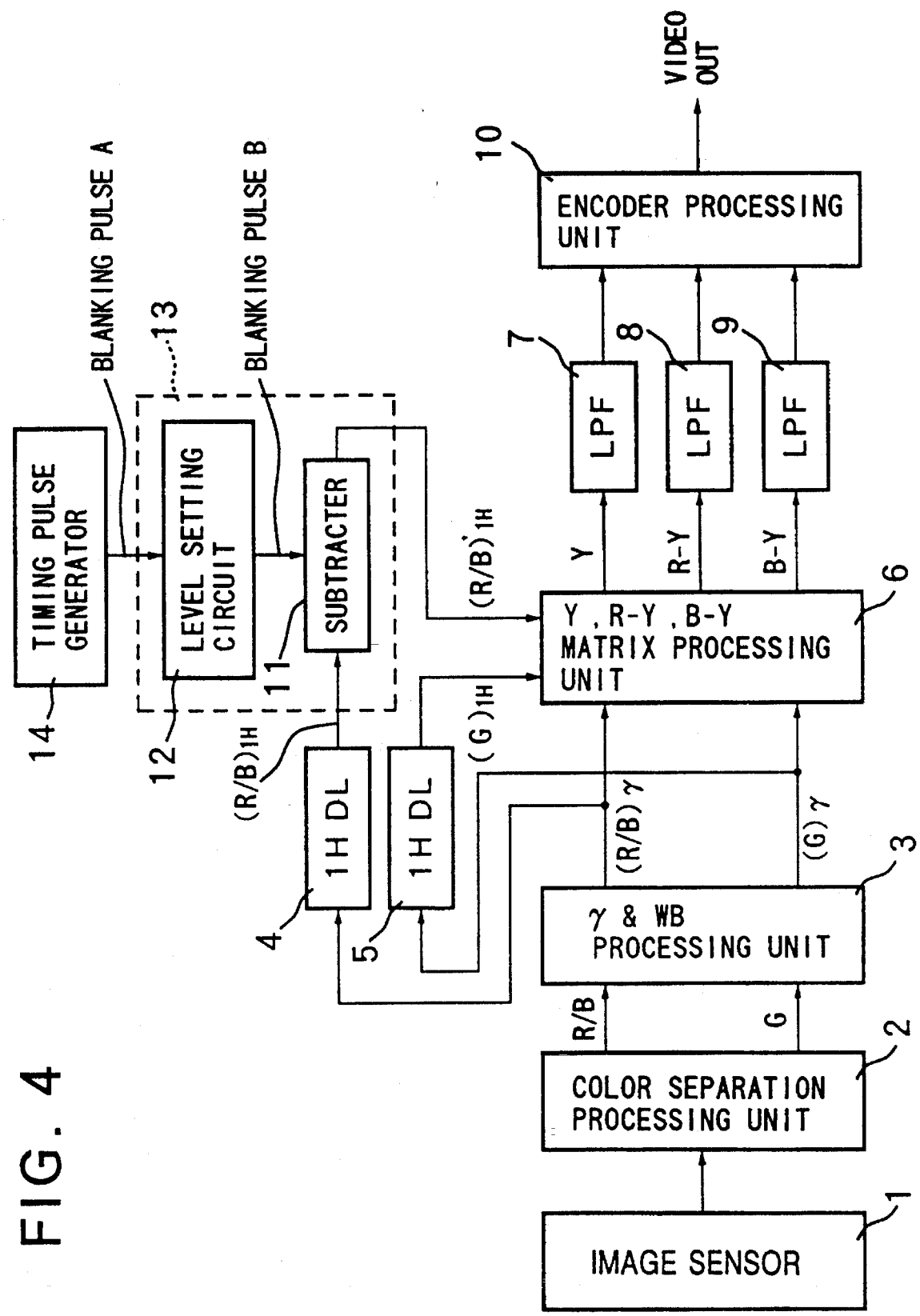
FIG. 4 is a block diagram showing an arrangement of a signal processing circuit of an image pickup apparatus according to the first embodiment of the present invention.

FIG. 4 is a block diagram showing an arrangement of a signal processing circuit of an image pickup apparatus according to the first embodiment of the present invention, and FIGS. 5(a) to 5(g) are waveform charts of signals for explaining an operation of the signal processing circuit.

Referring to FIG. 4, reference numeral 1 denotes an image sensor such as a CCD; 2, a color separation processing unit for color-separating an output from the image sensor 1; 3, a γ & WB processing unit for performing gamma processing and white balance processing of the color-separated video signal components in units of colors; 4 and 5, CCD drive type 1H delay lines (1HDLs) serving as delay means for delaying the video signal by one horizontal period (1H); 6, a matrix processing unit for deriving a luminance signal (Y) and color difference signals (R-Y and B-Y) by matrix processing; 7, 8, and 9, low-pass filters (LPFs); and 10, an encoder processing unit for deriving a VIDEO signal from the Y, R-Y and B-Y signals so as to output the VIDEO signal to a monitor or the like. Reference numeral 11 denotes a subtracter for subtracting a blanking pulse B (FIG. 5(f)) from an $(R/B)_{1H}$ signal (FIG. 5(c)) from the 1HDL 4; 12, a level setting circuit for attenuating a blanking pulse A (FIG. 5(e)) and outputting the blanking pulse B (FIG. 5 (f); and 14, a timing pulse generator for supplying the blanking pulse A (FIG. 5(e)) to the level setting circuit 12. The level setting circuit 12 and the subtracter 11 constitute a level adjusting circuit 13. Note that the subtracter 11 may be replaced with another circuit such as a nonlinear amplifier having the same function as that of the subtracter 11.

The attenuation amount of the level setting circuit 12 can be appropriately set by clock components (clock leakage amounts) of the R/B and G signals because the clock leakage amounts take different values in accordance with the arrangement of the preprocessing circuit, IC characteristics, and the like.

An operation of the signal processing circuit of the image pickup apparatus will be described with reference to FIGS. 5(a) to 7(c).

Figure 6:
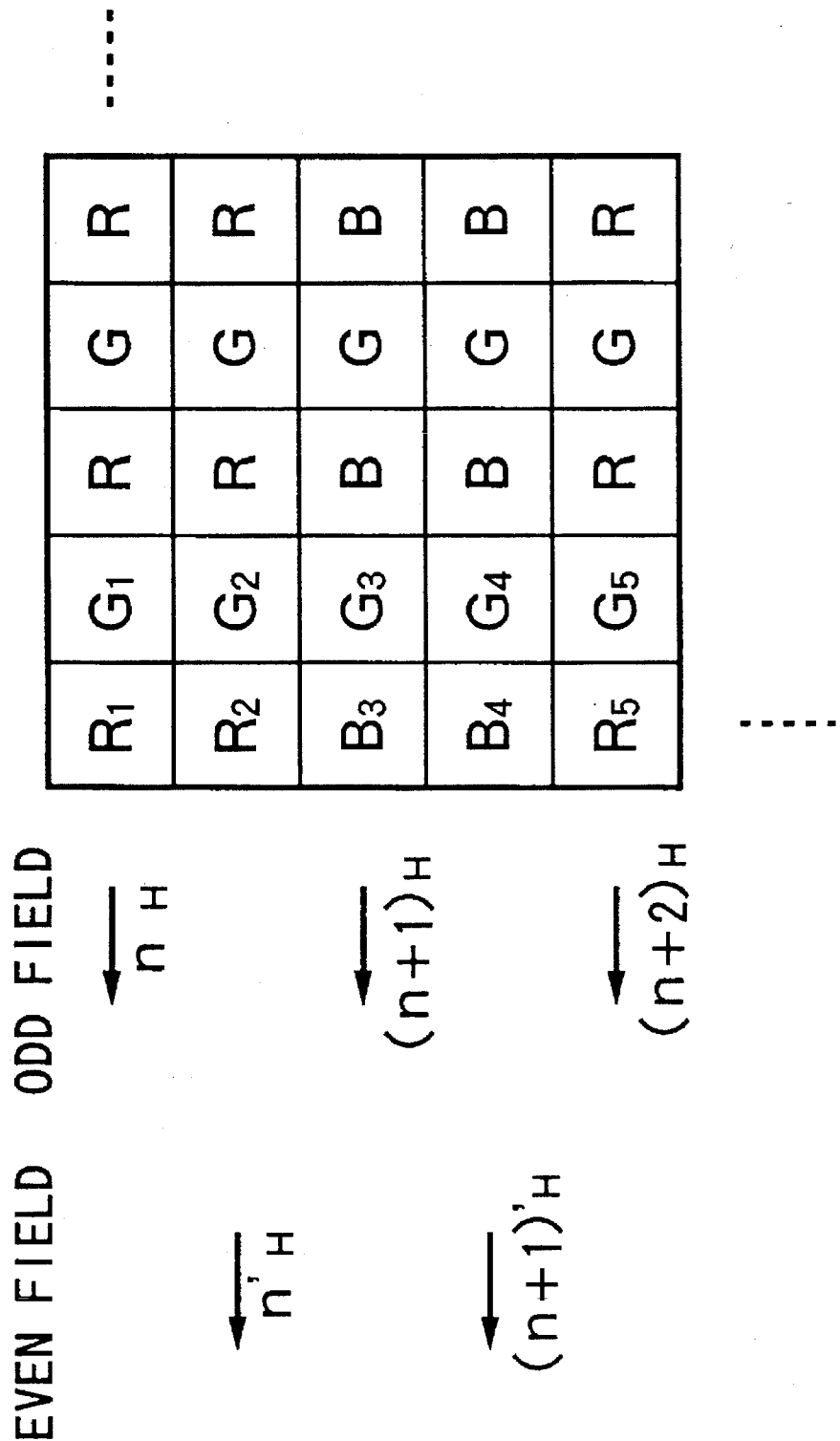
FIG. 6 is a table showing a color filter arrangement of the image sensor shown in FIG. 4.
Figure 7:
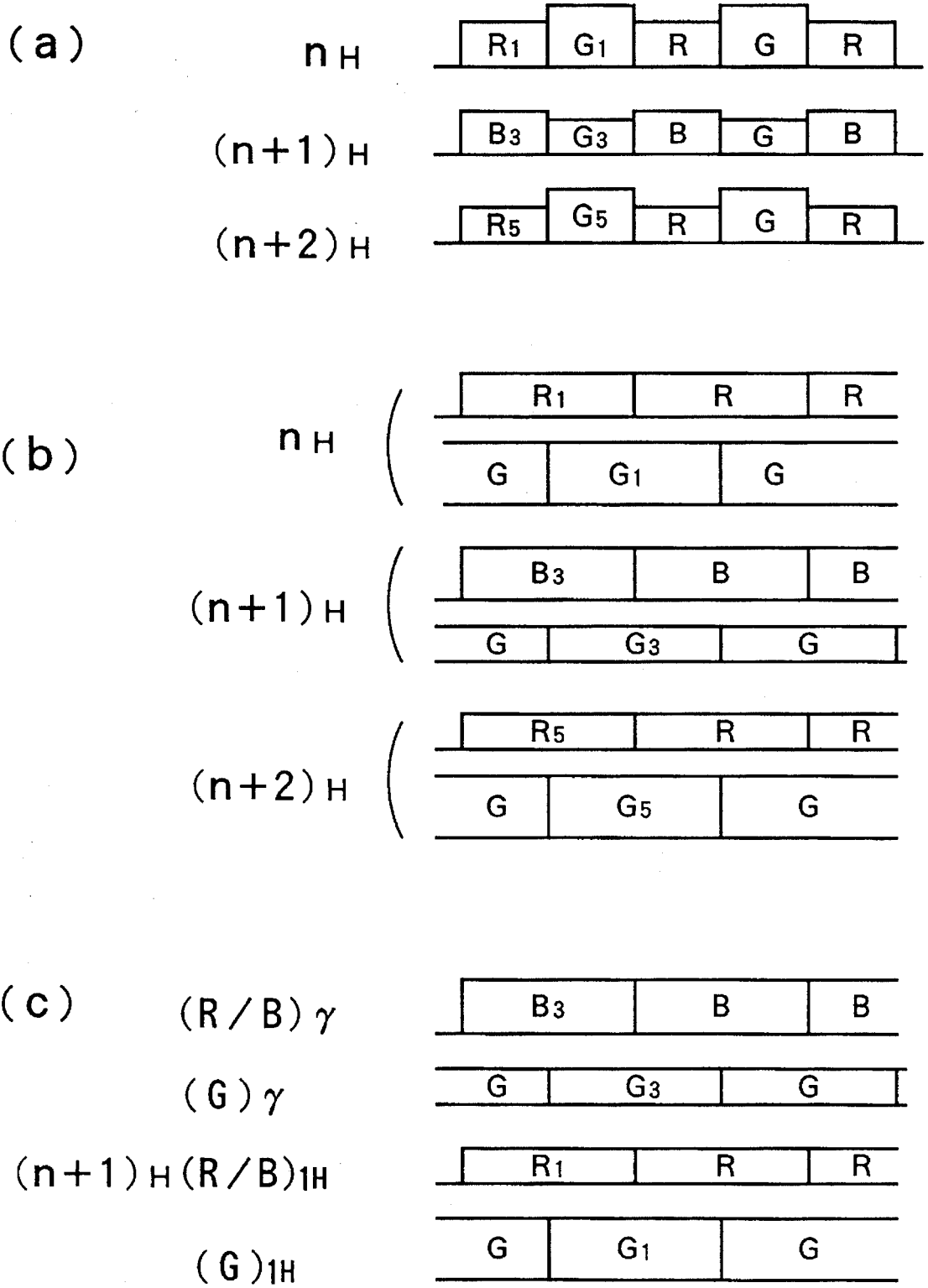
FIGS. 7(a) to 7(c) are timing charts for explaining an operation of the signal processing circuit of FIG. 4.

A color filter shown in FIG. 6 is arranged in the image sensor 1. In a frame read mode, a red signal $R_1$ and a green signal $G_1$ are read at the $n_H$-th line of an odd field, as indicated by an arrow "←" in FIG. 6. A blue signal $B_3$ and a green signal $G_3$ are read at the $(n+1)_H$-th line of the odd field. A red signal $R_2$ and a green signal $G_2$ are read at the $n'_H$-th line of an even field. A blue signal $B_4$ and a green signal $G_4$ are read at the $(N+1)'_H$-th line of the even field.

As shown in FIG. 7(a), the output from the image sensor 1 becomes a dot sequential output of R(B) and G signals. At the same time, the R and B signals become a line sequential output.

The output from the image sensor 1 is supplied to the color separation processing unit 2 and is separated into the G signal and the R/B line sequential signal, as shown in FIG. 7(b).

The color-separated R/B and G signals are subjected to gamma processing and white balance processing in the γ & WB processing unit 3, as shown in FIG. 7(c), and are output as (R/B)γ and (G)γ signals, respectively.

The (R/B)γ and (G)γ signals are directly input to the matrix processing unit 6, and at the same time are supplied to and delayed by the 1HDLs 4 and 5 by one horizontal period, thereby obtaining $(R/B)_{1H}$ and $(G)_{1H}$ signals shown in FIG. 7(c). The $(R/B)_{1H}$ and $(G)_{1H}$ signals are then supplied to the matrix processing unit 6.

The matrix processing unit 6 derives the luminance signal (Y) and the color difference signals (R-Y and B-Y) from the two-line signals shown in FIG. 7(c) as follows:

$$Y = 0.3 \cdot R_1 + 0.59 \cdot (G_3 + G_1)/2 + 0.11 \cdot B_3 \quad (1)$$

$$R-Y = 0.7(R_1-G_1) - 0.11(B_3-G_3) \quad (2)$$

$$B-Y = 0.89(B_3-G_3) - 0.30(R_1-G_1) \quad (3)$$

These signals are filtered through the low-pass filters 7, 8, and 9, respectively, so that the clock components thereof are removed. The Y, R-Y and B-Y signals are converted into a video signal by the encoder processing unit 10. The video signal is output to a monitor or the like.

As described with reference to the prior art, to prevent MTF degradation in a conventional image pickup apparatus, low-pass filters are not arranged at the inputs and outputs of the 1HDLs 4 and 5, and each signal is delayed by 1H without eliminating the clock component.

The clock components of the signals input to the 1HDLs 4 and 5 are synchronized with the 1HDL drive clock, as shown in FIG. 8. The clock components (clock leakage amounts) of the signals input to the 1HDLs 4 and 5 become different clock components due to the influences of the preprocessing circuit and IC characteristics.

More specifically, the different clock components are exemplified as an R/B signal having a large magnitude shown in FIG. 8(a) and a G signal having a small magnitude shown in FIG. 8(b).

In this case, the levels of the R/B and G signals are detected as average value levels including the clock components (levels a and b in FIGS. 8(a) and 8(b)). On the other hand, as the outputs from the 1HDLs 4 and 5 serving as delay means, since the levels at the phases of the sampling pulses become output signal levels, levels c and d shown in FIGS. 8(c) and 8(d) are detected.

Even if the levels of the R/B and G signals prior to the input to the 1HDLs 4 an 5 are set at the black level (non-signal level) (a=b), outputs from the delay means have a difference in black level (c≠d). For this reason, errors occur in the Y, R-Y, and B-Y levels in the non-signal state, and a level difference occurs every 1H.

The variation in the R-Y signal will be described in detail with reference to FIGS. 8(a) to 8(d) and equation (2) above.

The respective signal levels in FIGS. 8(a) to 8(d) are defined as a, b, c, and d, and conditions a=b and c≠d are satisfied.

At the $(n+1)_H$-th line, R-Y is derived from equation (2) as follows:

$$\begin{aligned} R-Y &= 0.7(R_1-G_1) - 0.11(B_3-G_3) \\ &= 0.7(c-d) - 0.11(a-b) \\ &= 0.7(c-d) \end{aligned}$$

At the $(n+2)_H$-th line, $$\begin{aligned} R-Y &= 0.7(R_5-G_5) - 0.11(B_3-G_3) \\ &= 0.7(a-b) - 0.11(c-d) \\ &= 0.11(c-d) \end{aligned}$$

A level difference of 0.59(c–d) occurs between the $(n+1)_H$- and $(n+2)_H$-th lines.

Therefore, a color difference occurs every line, and a difference in luminance occurs every line in the same principle as described, thereby degrading image quality.

Figure 5:
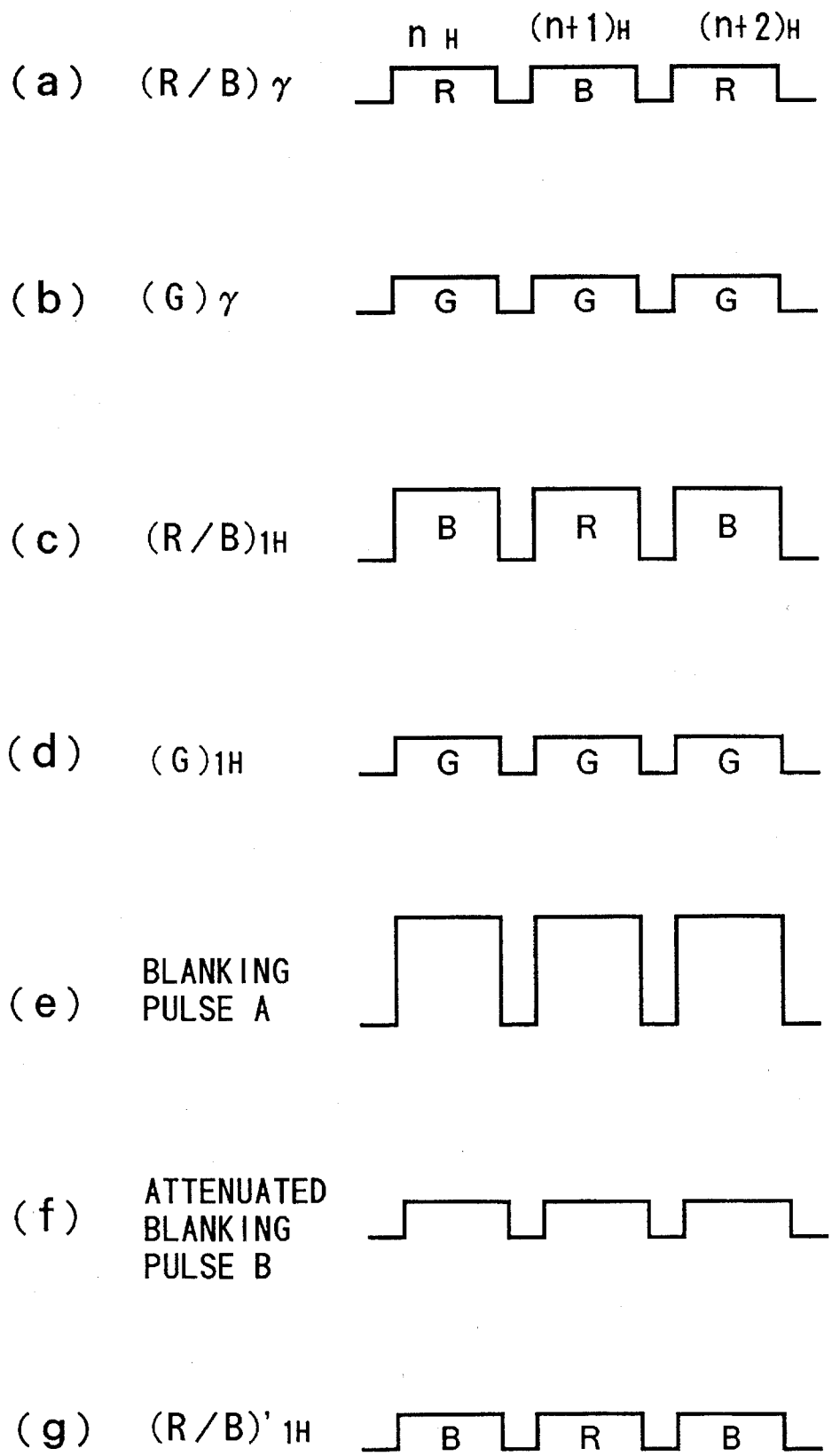
FIGS. 5(a) to 5(g) are waveform charts of signals for explaining an operation of the signal processing circuit according to the first embodiment.

In this embodiment, the blanking pulse A (FIG. 5(e)) output from the timing pulse generator 14 shown in FIG. 4 is attenuated by an attenuation amount properly set by the level setting circuit 12 to obtain the blanking pulse B (FIG. 5(f)). The blanking pulse B (FIG. 5(f)) is subtracted from the $(R/B)_{1H}$ signal (FIG. 5(c)) from the 1HDL 4 to obtain the $(R/B)'_{1H}$ signal (FIG. 5 (g)), the level of which is matched with that of the output $(G)_1H$ (FIG. 5(d)). The $(R/B)'_{1H}$ signal and the $(G)_{1H}$ signal are processed by the matrix processing unit 6 to obtain the luminance signal (Y) and the color difference signals (R-Y and B-Y). These signals are output as a video signal through the low-pass filters 7, 8, and 9 and the encoder processing unit 10.

The video signal thus processed is free from a color difference occurring in units of lines and a luminance difference occurring in units of lines, thereby obtaining a high-quality image.

(Second Embodiment)

Figure 9:
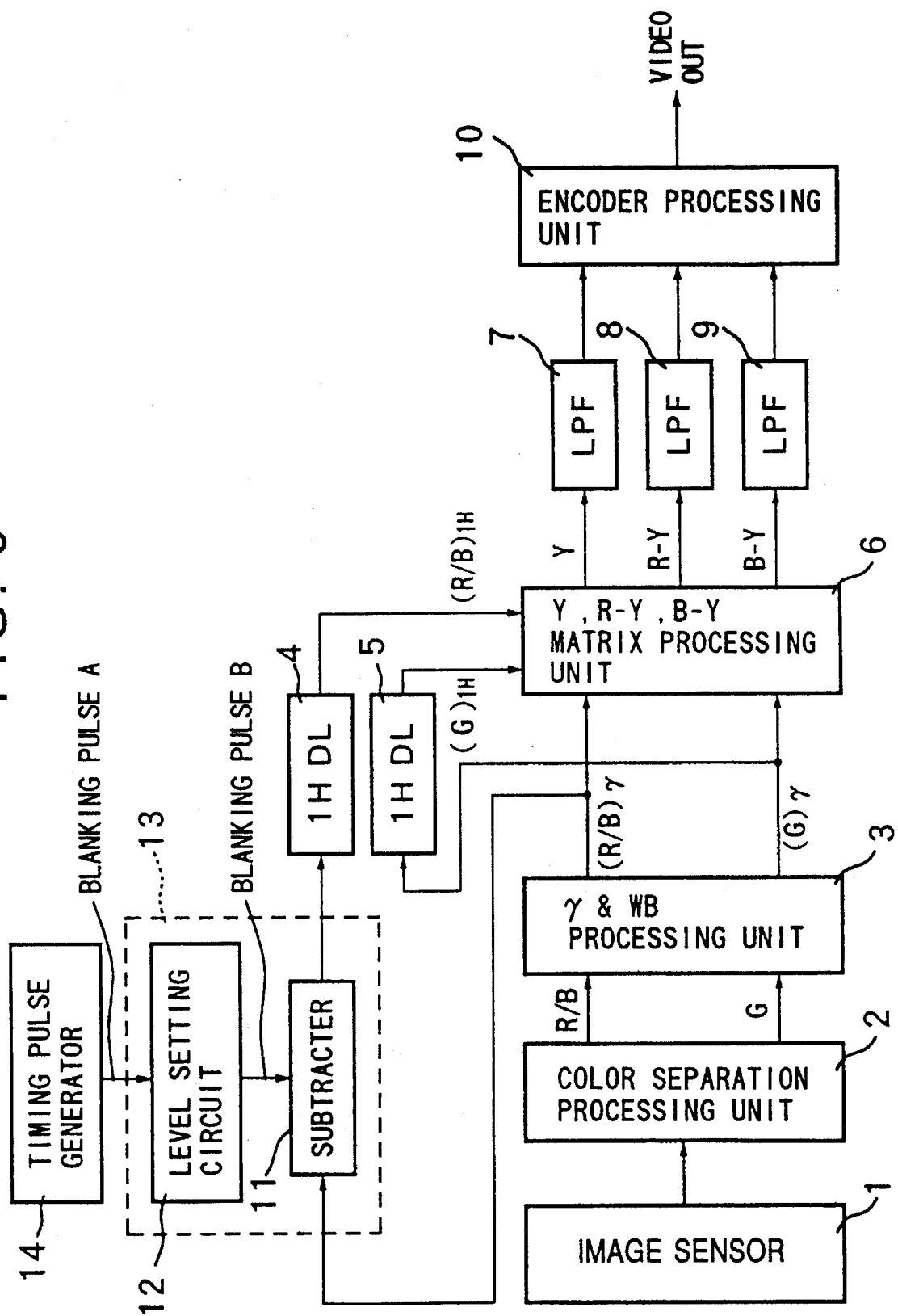
FIG. 9 is a block diagram showing an arrangement of a signal processing circuit of an image pickup apparatus according to the second embodiment of the present invention.

FIG. 9 is a block diagram showing an arrangement of a signal processing circuit of an image pickup apparatus according to the second embodiment of the present invention. The same reference numerals as in FIG. 4 denote the same parts in FIG. 9, and a detailed description thereof will be omitted.

As shown in FIG. 9, in this embodiment, a level adjusting circuit 13 constituted by a level setting circuit 12 and a subtracter 11 is arranged at the input of a 1HDL 4, and a blanking pulse A is attenuated by preprocessing and is subtracted by the subtracter 11. In this embodiment, the same effect as in the first embodiment can be obtained.

(Third Embodiment)

Figure 10:
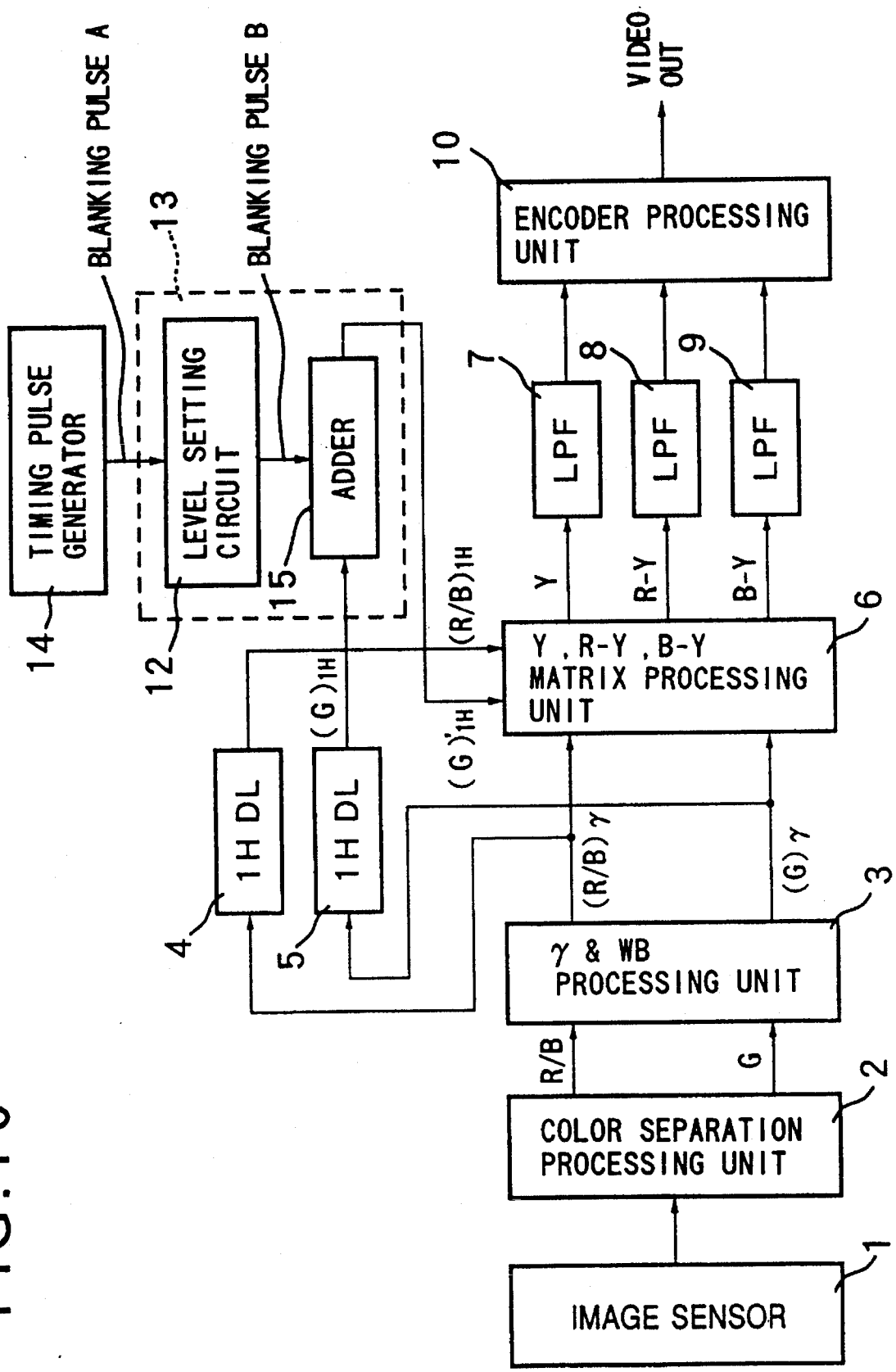
FIG. 10 is a block diagram showing an arrangement of a signal processing circuit of an image pickup apparatus according to the third embodiment of the present invention.

FIG. 10 is a block diagram showing an arrangement of a signal processing circuit of an image pickup apparatus according to the third embodiment of the present invention. The same reference numerals as in FIG. 4 denote the same parts in FIG. 10, and a detailed description thereof will be omitted.

As shown in FIG. 10, in this embodiment, an adder 15 for attenuating a blanking pulse A and adding it is arranged at the output of a 1HDL 5, and a level adjusting circuit 13 is constituted by a level setting circuit 12 and the adder 15. More specifically, in this embodiment, a blanking pulse B is not subtracted from an $(R/B)_{1H}$ signal, but the blanking pulse B is added to a $(G)_{1H}$ signal, thereby matching the level of the $(R/B)_{1H}$ signal with that of the $(G)_{1H}$ signal. The same effect as in the first embodiment can be obtained in the third embodiment.

(Fourth Embodiment)

Figure 11:
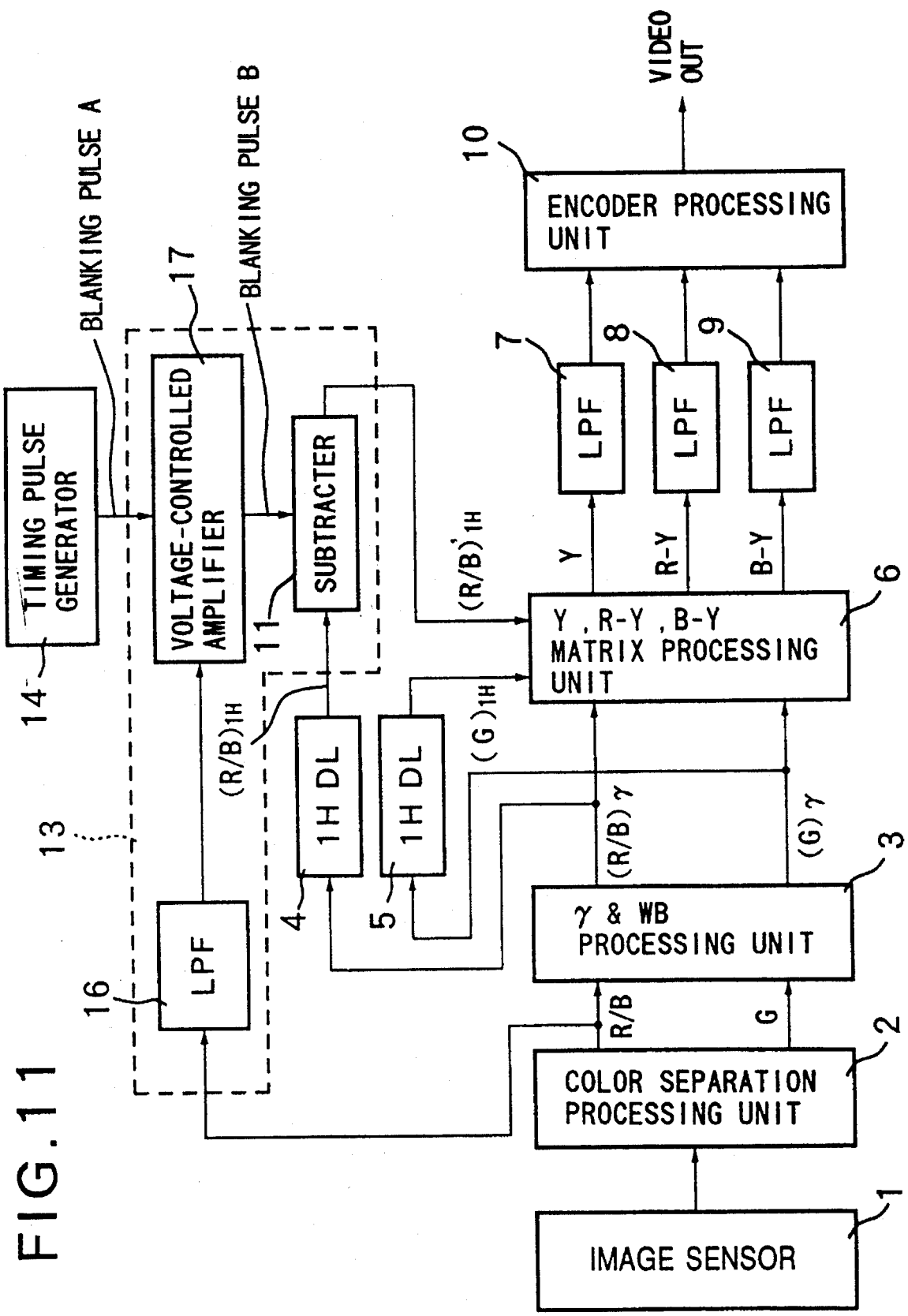
FIG. 11 is a block diagram showing an arrangement of a signal processing circuit of an image pickup apparatus according to the fourth embodiment of the present invention.

FIG. 11 is a block diagram showing an arrangement of a signal processing circuit of an image pickup apparatus according to the fourth embodiment of the present invention. The same reference numerals as in FIG. 4 denote the same parts in FIG. 11, and a detailed description thereof will be omitted.

Referring to FIG. 11, reference numeral 16 denotes a low-pass filter (LPF); and 17, a voltage-controlled amplifier. The low-pass filter (LPF) 16 and the voltage-controlled amplifier 17 constitute a level setting circuit. The low-pass filter (LPF) 16, the voltage-controlled amplifier 17, and a subtracter 11 constitute a level adjusting circuit 13.

An output R/B from a color separation processing unit 2 is supplied to the LPF 16, and only the low-frequency component of the output R/B is output from the LPF 16. This low-frequency component is input to the control terminal of the voltage-controlled amplifier 17, and the attenuation amount of a blanking pulse A is controlled by the control voltage level of the low-frequency component. A blanking pulse B, the attenuation amount of which is controlled, is subtracted from an $(R/B)_{1H}$ signal by the subtracter 11. An output $(R/B)'_{1H}$ signal from the subtracter 11 is a signal level-matched with an output $(G)_{1H}$ signal.

Figure 12:
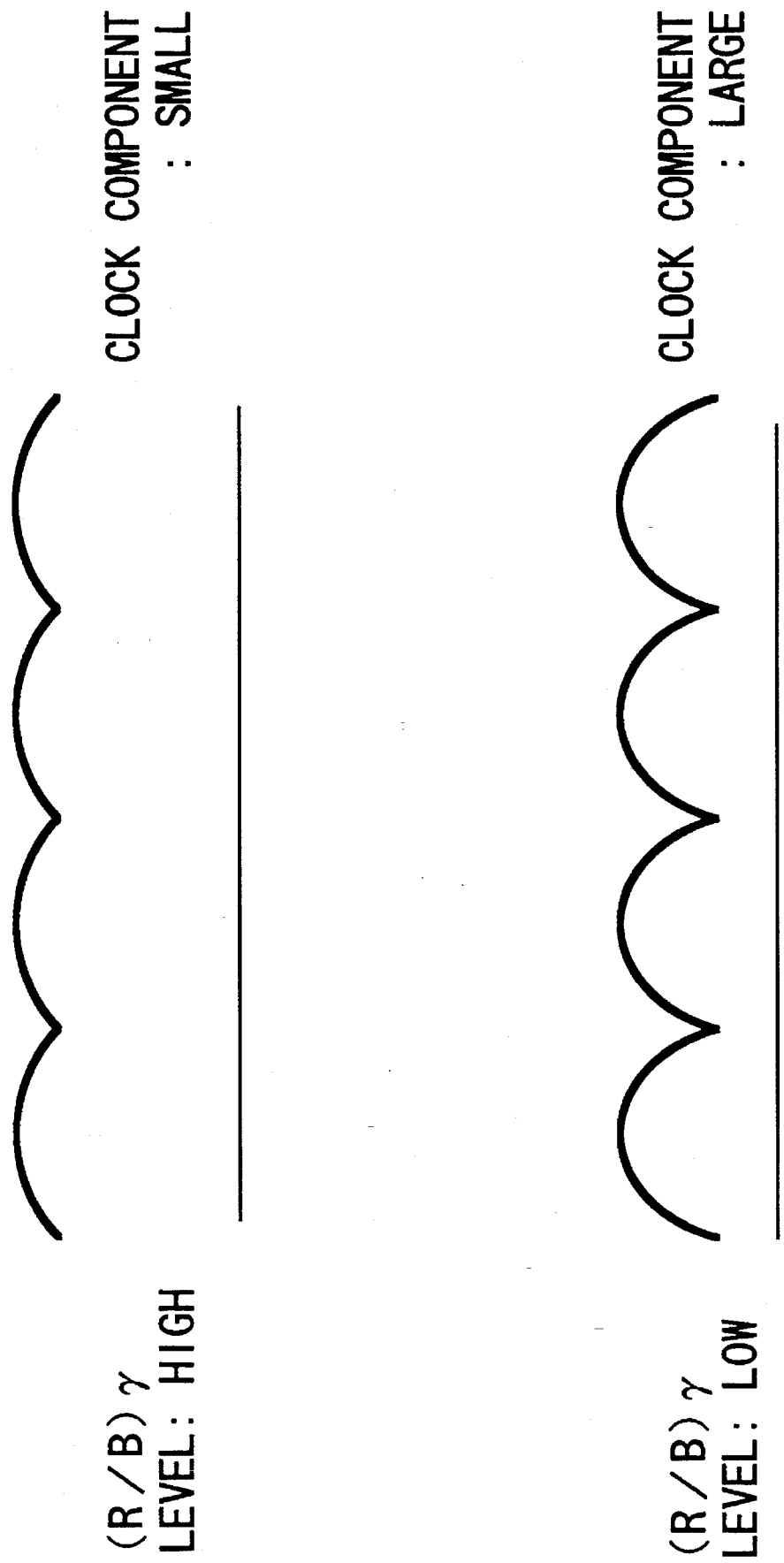
FIG. 12 is a waveform chart of signals for explaining an operation of the signal processing circuit of the fourth embodiment.

In this embodiment, since the attenuation amount of the blanking pulse A is controlled in accordance with the level of the R/B signal, the signal level is increased. For this reason, even if the clock leakage amount is changed by an influence of γ correction, adjustment for compensating for this change can be performed. More specifically, as shown in FIG. 12, when the signal level is high, the gain is decreased by the influence of γ correction, and the clock component is reduced. For this reason, the attenuation amount of the blanking pulse A is set large to reduce the adjustment amount. To the contrary, when the signal level is low, the gain is increased by the influence of γ correction, and the clock component is increased. In this case, the attenuation amount of the blanking pulse A is reduced to increase the adjustment amount.

(Fifth Embodiment)

Figure 13:
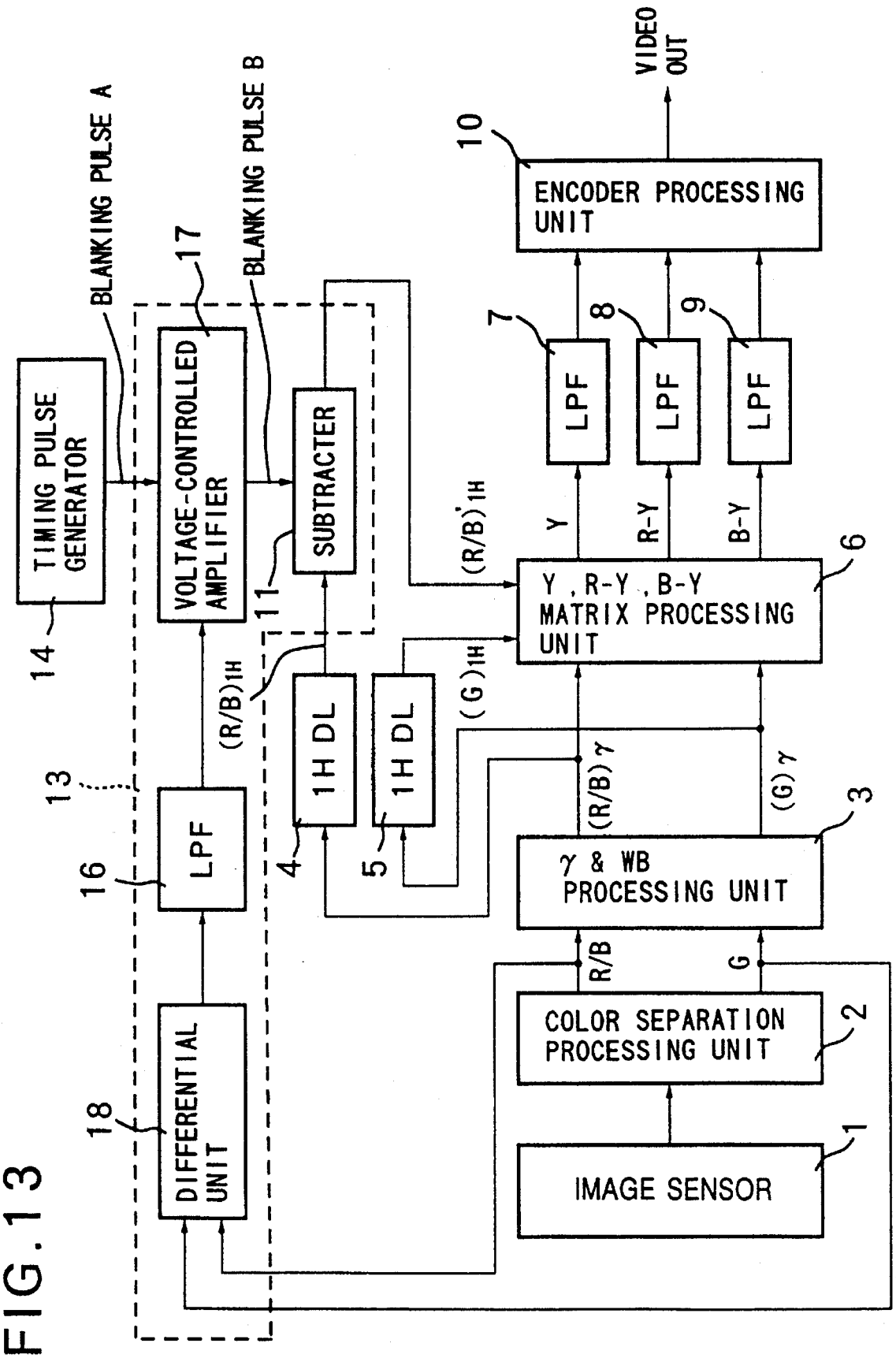
FIG. 13 is a block diagram showing an arrangement of a signal processing circuit of an image pickup apparatus according to the fifth embodiment of the present invention.

FIG. 13 is a block diagram showing an arrangement of a signal processing circuit of an image pickup apparatus according to the fifth embodiment of the present invention. The same reference numerals as in FIG. 11 denote the same parts in FIG. 13, and a detailed description thereof will be omitted.

Referring to FIG. 13, reference numeral 18 denotes a differential unit. The differential unit 18, a low-pass filter (LPF) 16, and a voltage-controlled amplifier 17 constitute a level setting circuit. The differential unit 18, the low-pass filter 16, the voltage-controlled amplifier 17, and a subtracter 11 constitute a level adjusting circuit 13.

In the fourth embodiment, the attenuation amount of the blanking pulse A is determined by the R/B signal. However, in this embodiment, as shown in FIG. 13, a level difference between an R/B signal and a G signal is detected by the differential unit 18, and the gain of the voltage-controlled amplifier 17 is controlled by the low-frequency component of a detection signal from the differential unit 18, thereby controlling the attenuation amount of a blanking pulse A.

In this embodiment, since the adjustment amount is determined in consideration of a change in clock component of the G signal in addition to a change in clock component of the R/B signal, a better effect can be obtained. That is, when the level of the R/B signal is high and the clock component is small, and when the level of the G signal is low and the clock component is large, the attenuation amount is increased to reduce the adjustment amount.

Note that a signal for detecting the signal level may be a WB-processed signal or γ-corrected signal.

(Sixth Embodiment)

Figure 14:
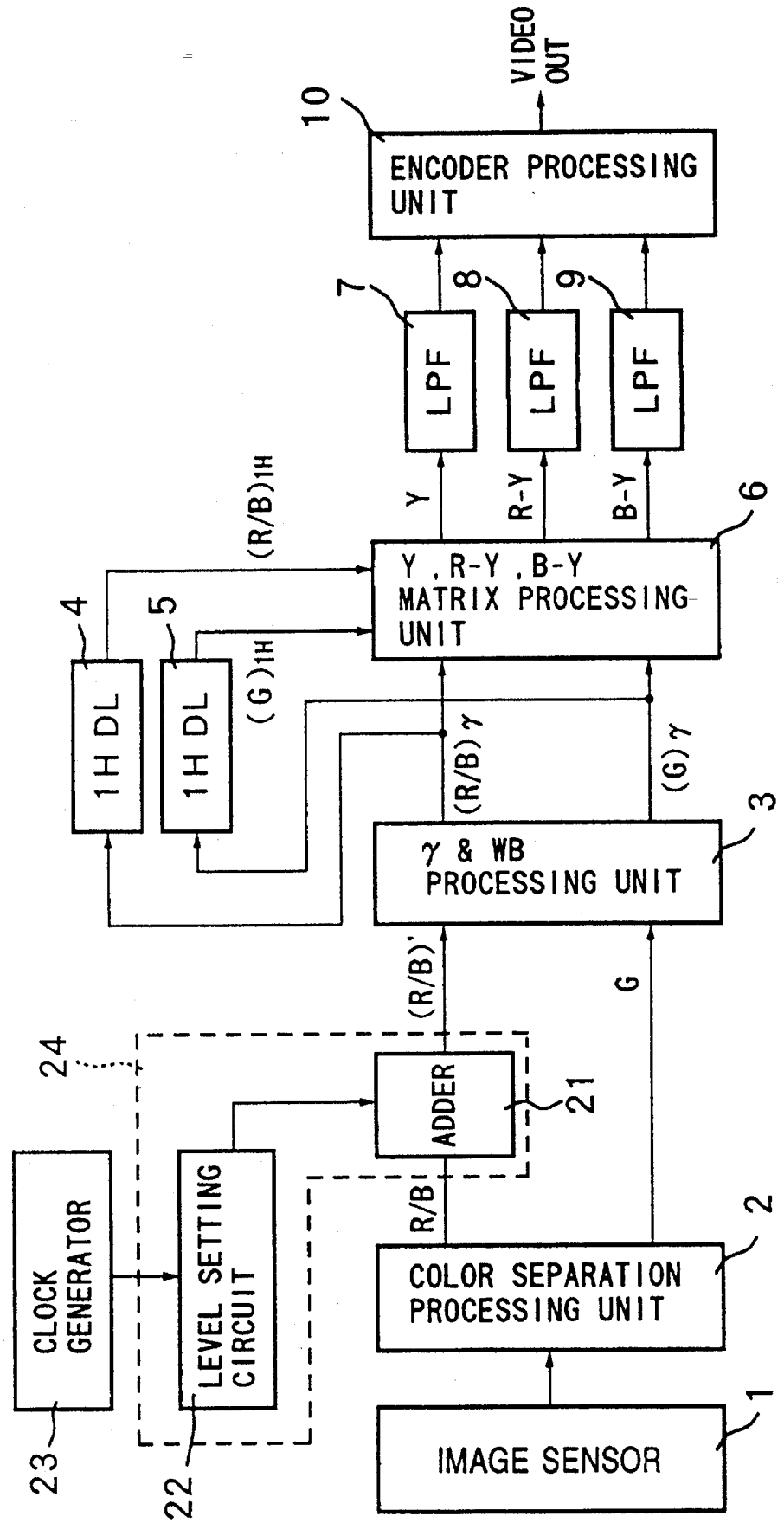
FIG. 14 is a block diagram showing an arrangement of a signal processing circuit of an image pickup apparatus according to the sixth embodiment of the present invention.

FIG. 14 is a block diagram showing an arrangement of a signal processing circuit of an image pickup apparatus according to the sixth embodiment of the present invention. The same reference numerals as in FIG. 4 denote the same parts in FIG. 14, and a detailed description thereof will be omitted.

Referring to FIG. 14, reference numeral 21 denotes an adder. The adder 21 adds an output R/B from a color separation processing unit 2 and an attenuated clock signal. Reference numeral 22 denotes a level setting circuit for attenuating the clock and supplying the attenuated clock to the adder 21; and 23, a clock generator. The adder 21 and the level setting circuit 22 constitute a signal correction circuit 24.

An operation of the signal processing circuit of this embodiment will be described with reference to FIGS. 14 to 15(f).

An output from an image sensor 1 is color-separated by the color separation processing unit 2 to output an R/B signal and a G signal. The R/B signal shown in FIG. 15(a) has a smaller clock leakage amount than that of the G signal shown in FIG. 15(b).

In this embodiment, a clock (FIG. 15(c)) output from the clock generator 23 is attenuated with an attenuation amount properly set by the level setting circuit 22. The attenuated clock signal is added to the R/B signal (FIG. 15(a) )by the adder 21 to obtain a signal (R/B)' shown in FIG. 15(f). This signal (R/B)' is subjected to gamma processing and white balance processing in a γ & WB processing unit 3. A video signal is delayed by 1H delay lines (1HDLs) 4 and 5 by one horizontal period. In this manner, since signal processing is performed after the clock leakage amount is corrected, the level of the R/B signal is matched with the level of the G signal prior to the input to the 1HDLs. Therefore, the levels of the R/B and G signals as the outputs from the 1HDLs can be matched with each other.

Note that the attenuation amount of the level setting circuit 22 is appropriately set by the clock components (clock leakage amounts) of the R/B and G signals because the clock leakage amounts have different values due to the arrangement of the preprocessing circuit and IC characteristics.

Figure 16:
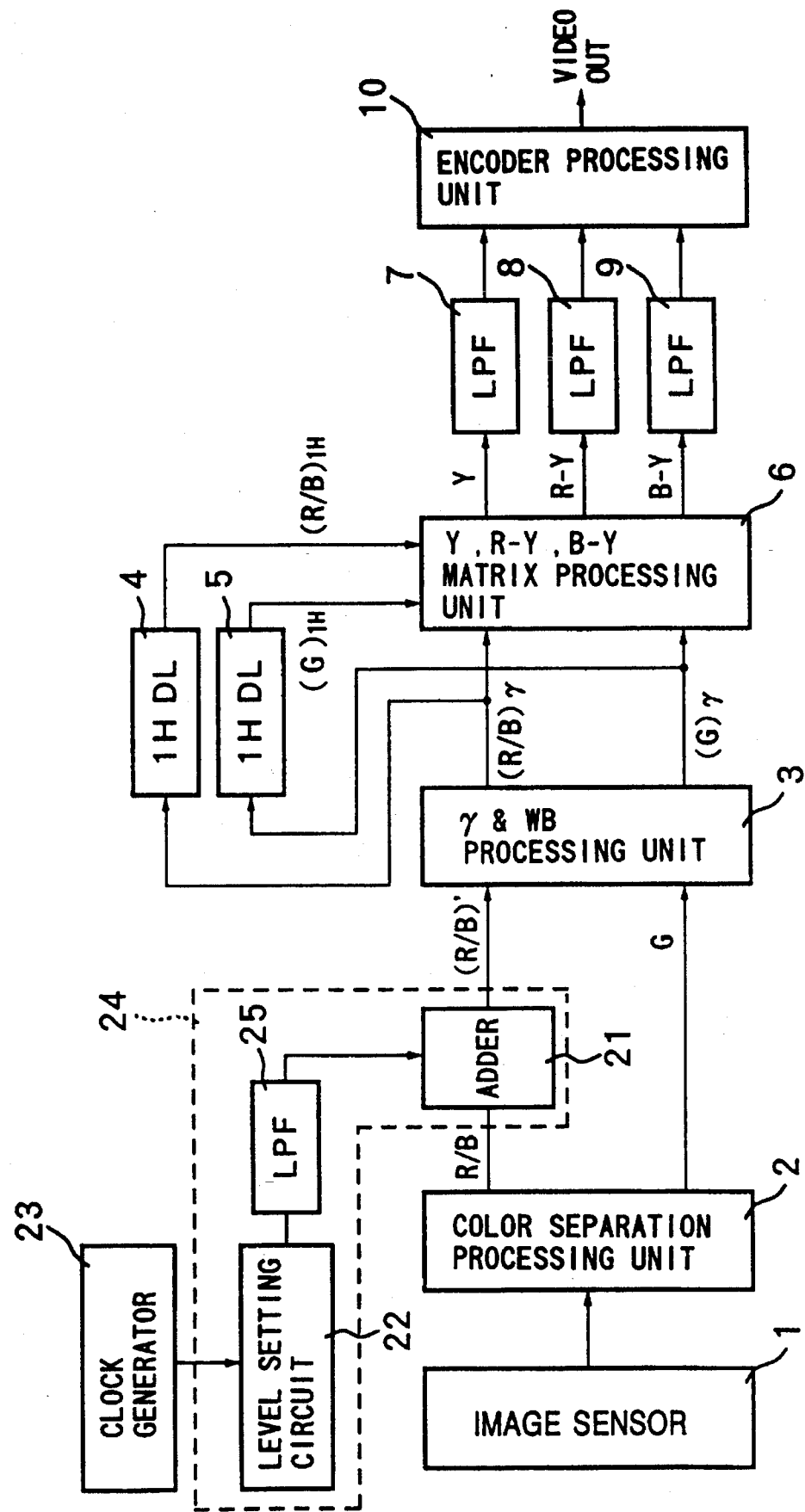
FIG. 16 is a block diagram showing another arrangement of the signal processing circuit of the image pickup apparatus according to the sixth embodiment of the present invention.

A pulse supplied to the adder 21 may be a triangular wave synchronized with the clock leakage of the signal R/B or a signal obtained by eliminating a high-frequency component of the triangular wave, as shown in FIG. 15(d) or 15(e). This pulse can be ideal if it is similar to the clock leakage waveform superposed on the signal. FIG. 16 is a block diagram showing another arrangement of the signal processing circuit in which a low-pass filter (LPF) 25 is arranged for a clock waveform so as to filter the clock to have a similar waveform to the clock leakage waveform, and the filtered pulse is input to the adder 21. The adder 21, the LPF 25, and the level setting circuit 22 constitute the signal correction circuit 24.

(Seventh Embodiment)

Figure 17:
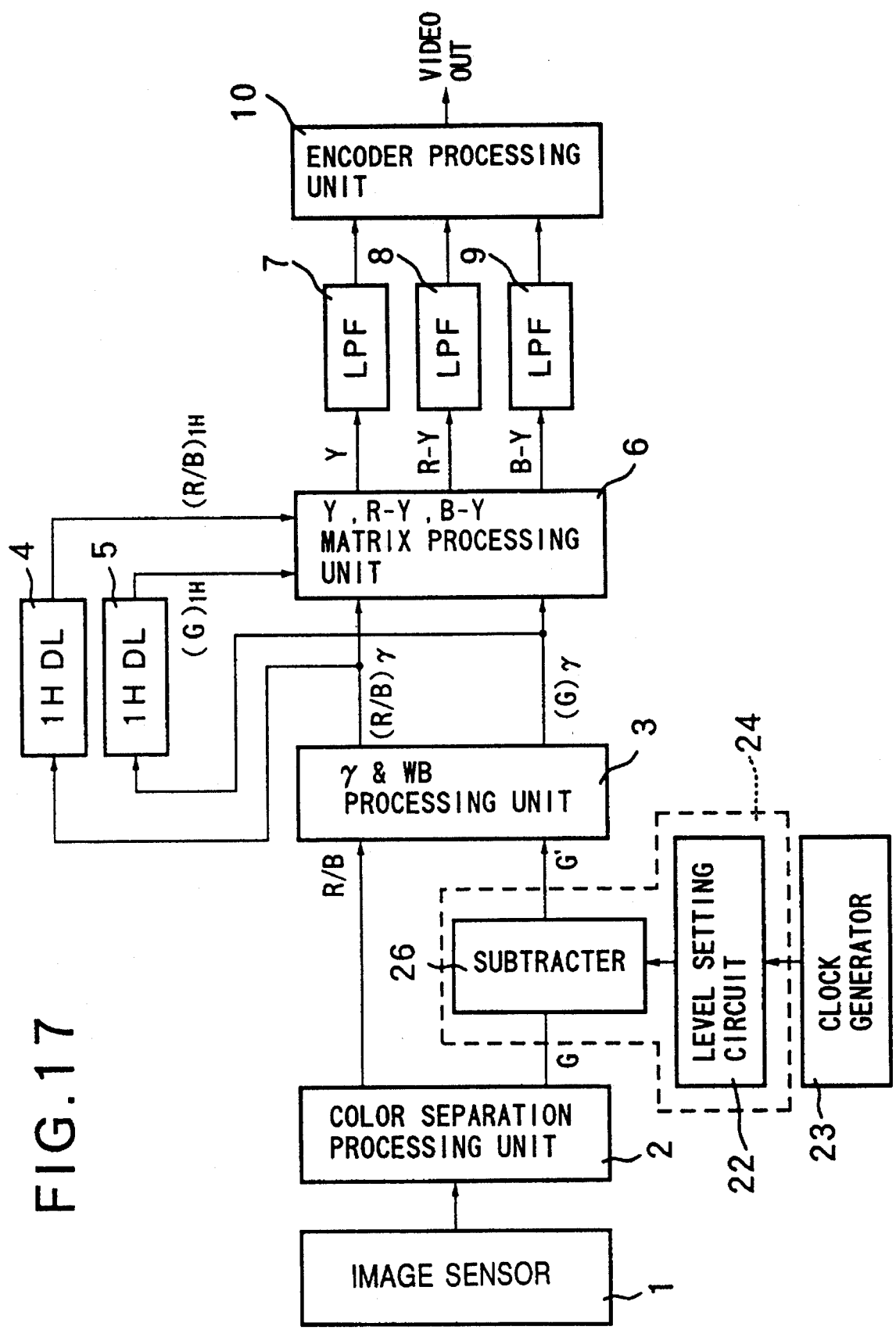
FIG. 17 is a block diagram showing an arrangement of a signal processing apparatus of an image pickup apparatus according to the seventh embodiment of the present invention.

FIG. 17 is a block diagram showing an arrangement of a signal processing circuit of an image pickup apparatus according to the seventh embodiment of the present invention. The same reference numerals as in FIG. 14 denote the same parts in FIG. 17, and a detailed description thereof will be omitted.

In the sixth embodiment, the clock pulse is attenuated, and the attenuated clock pulse is added to the R/B signal by the adder 21. In this embodiment, however, as shown in FIG. 17, a clock pulse is attenuated, and the attenuated clock pulse is subtracted from a G signal by a subtracter 26. The subtracter 26 and a level setting circuit 22 constitute a signal correction circuit 24.

The same effect as in the sixth embodiment can be obtained in this embodiment.

(Eighth Embodiment)

Figure 18:
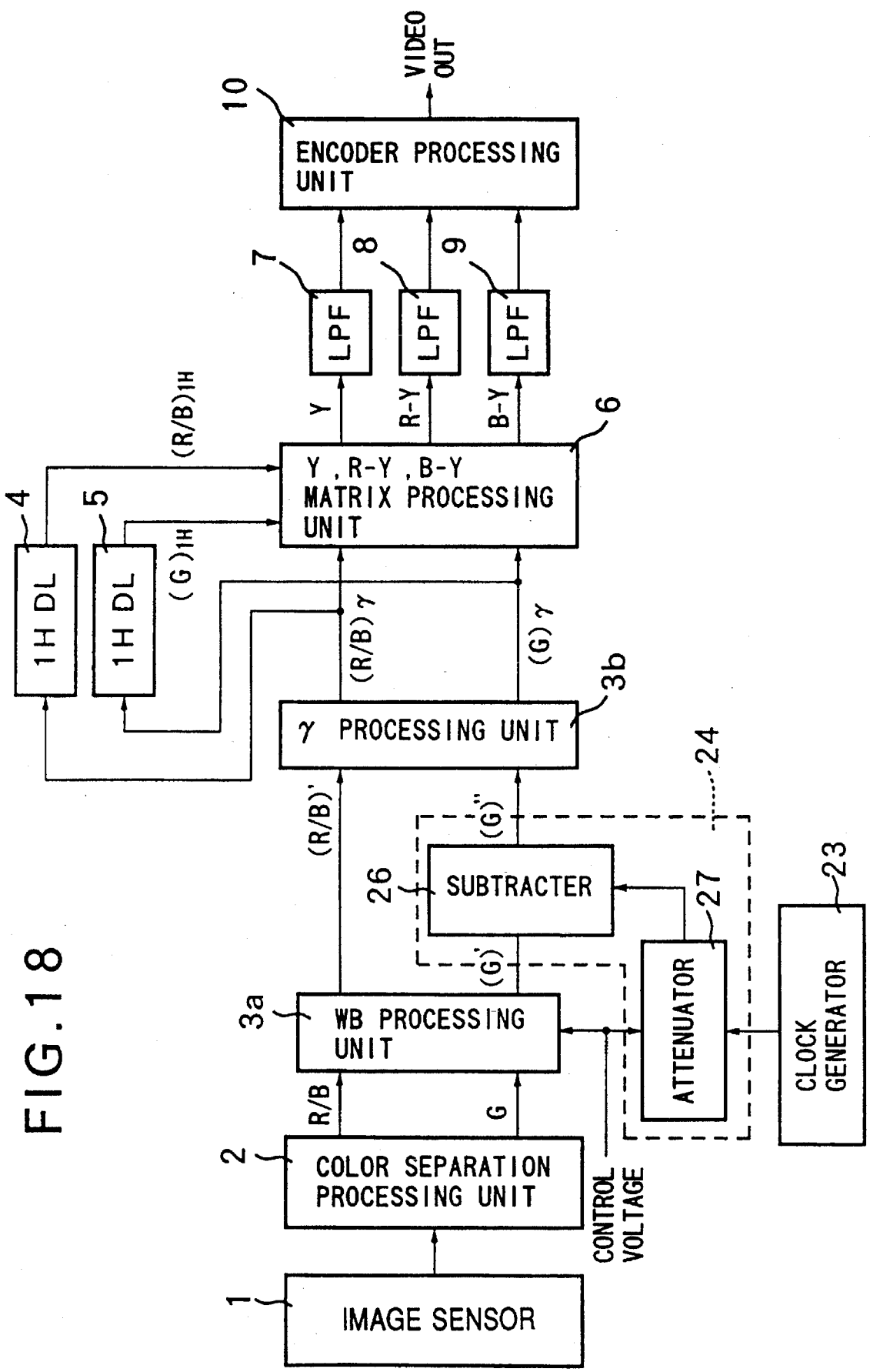
FIG. 18 is a block diagram showing an arrangement of a signal processing apparatus of an image pickup apparatus according to the eighth embodiment of the present invention.

FIG. 18 is a block diagram showing an arrangement of a signal processing circuit of an image pickup apparatus according to the eighth embodiment of the present invention. The same reference numerals as in FIG. 14 denote the same parts in FIG. 18, and a detailed description thereof will be omitted.

In the sixth and seventh embodiments, the clock signal is added to or subtracted from the output from the color separation processing unit 2 before gamma processing and white balance processing are performed in the γ & WB processing unit 3. In this embodiment, however, as shown in FIG. 18, after white balance processing is performed by a WB processing unit 3a but before gamma processing is performed by a γ processing unit 3b, an attenuated clock is subtracted in a subtracter 26. The attenuation amount of an attenuator 27 for attenuating the clock from a clock generator 23 is changed in accordance with a WB amplifier gain of the WB processing unit 3a. This variable control attenuator 27 is constituted by a voltage-controlled amplifier and the like. The subtracter 26 and the attenuator 27 constitute a signal correction circuit 24.

More specifically, when the WB amplifier for the R and B components has a high gain, the clock leakage amounts of the R and B signals are increased. The clock attenuation amount in the attenuator 27 is decreased accordingly, thereby increasing the clock leakage amount of a (G)" signal.

According to this embodiment, even if the gain of the WB amplifier is changed, the clock leakage amount can be controlled to cope with the change in gain.

(Ninth Embodiment)

Figure 19:
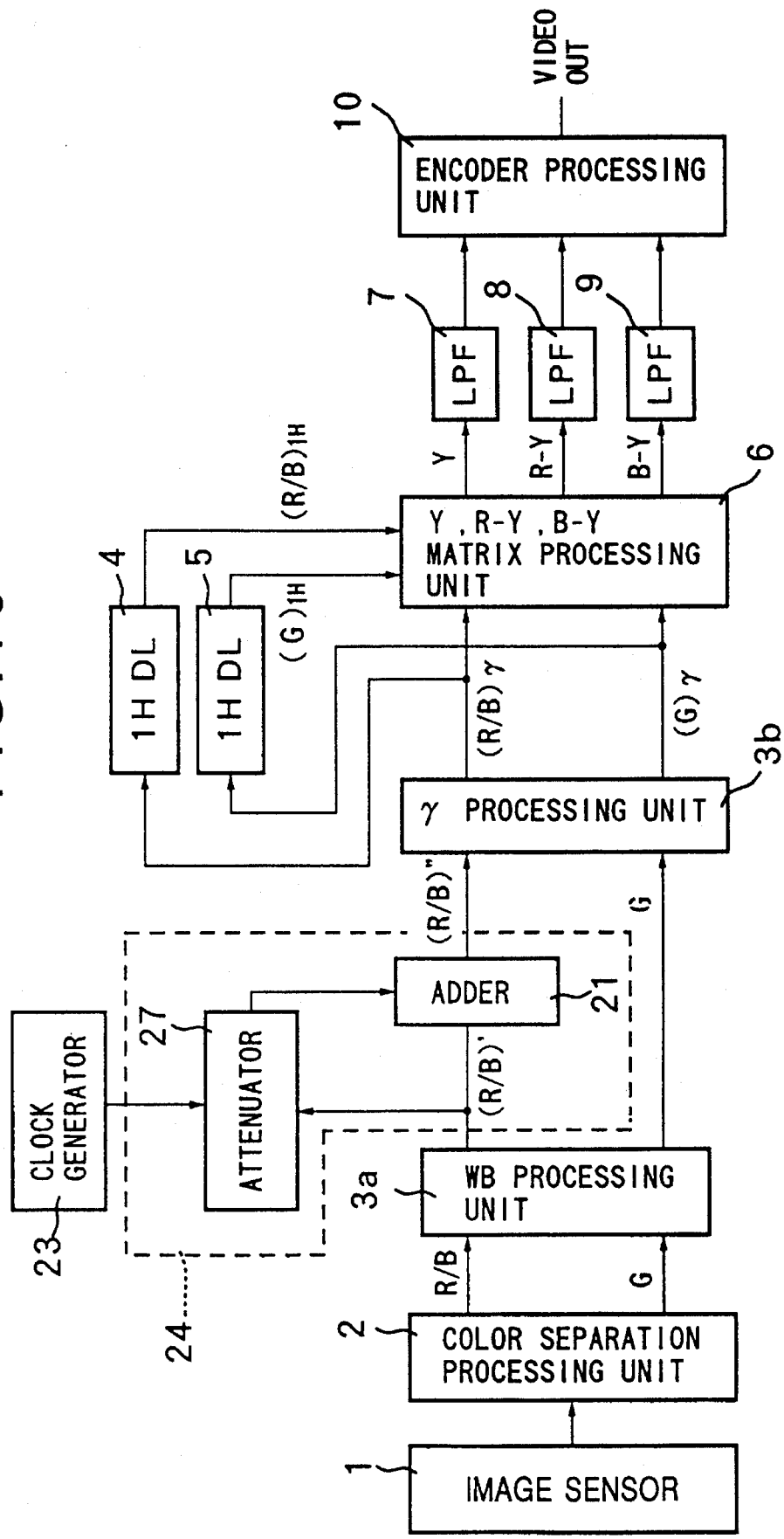
FIG. 19 is a block diagram showing an arrangement of a signal processing circuit of an image pickup apparatus according to the ninth embodiment of the present invention.

FIG. 19 is a block diagram showing an arrangement of a signal processing circuit of an image pickup apparatus according to the ninth embodiment of the present invention. The same reference numerals as in FIG. 19 denote the same parts in FIG. 18, and a detailed description thereof will be omitted.

As shown in FIG. 19, in this embodiment, the attenuation amount of a clock pulse is controlled in accordance with an (R/B)' signal level as an output from a WB processing unit 3a. When the (R/B)' signal level is high, the attenuation amount is decreased, and a clock pulse component added to the (R/B)' signal is increased. However, when the (R/B)' signal level is low, the attenuation amount is increased, and the clock pulse component added to the (R/B)' signal is reduced. An adder 21 and an attenuator 27 constitute a signal correction circuit 24.

According to this embodiment, when the R/B signal level is high, the gain is reduced due to the influence of γ processing, and the clock leakage amount of the R/B signal is reduced. If the R/B signal level is low, the gain is increased due to the influence of γ processing, and the addition amount of the clock pulse is changed to compensate for an operation for increasing the clock leakage amount of the R/B signal, thereby performing control with a higher precision.

Figure 20:
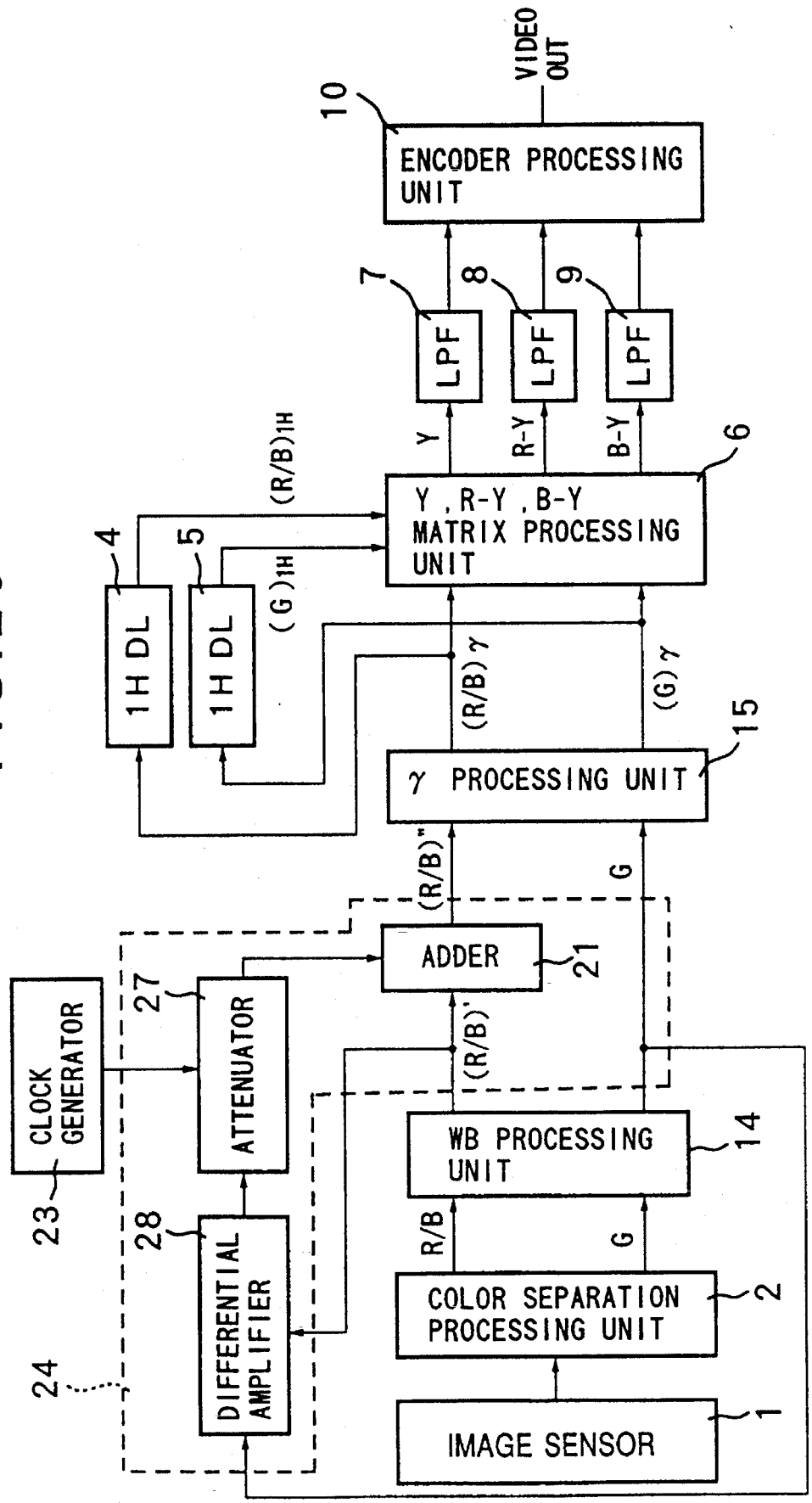
FIG. 20 is a block diagram showing another arrangement of the signal processing circuit of the image pickup apparatus according to the ninth embodiment of the present invention.

As shown in FIG. 20, a signal level for determining an attenuation amount is not limited to the R/B signal, but may be a difference signal between the R/B signal and the G signal.

Referring to FIG. 20, the attenuator 27 comprises a voltage-controlled amplifier for causing a differential amplifier 28 to detect a level difference between the (R/B)' signal and the G signal and attenuating the clock pulse in accordance with the detection level. The adder 21, the attenuator 27, and the differential amplifier 28 constitute the signal correction circuit 24. In this manner, when the addition amount of the clock pulse is controlled by the level difference between the R/B signal and the G signal, correction can be performed in consideration of the degrees of γ processing of both the R/B signal and the G signal. Therefore, control can be performed with a higher precision.

As described above, according to this embodiment, the level differences and errors occurring every 1H in a luminance signal (Y) and color difference signals (R-Y and B-Y) can be reduced.

Image pickup apparatuses according to embodiments for solving the second problem will be described below.

(Tenth Embodiment)

Figure 21:
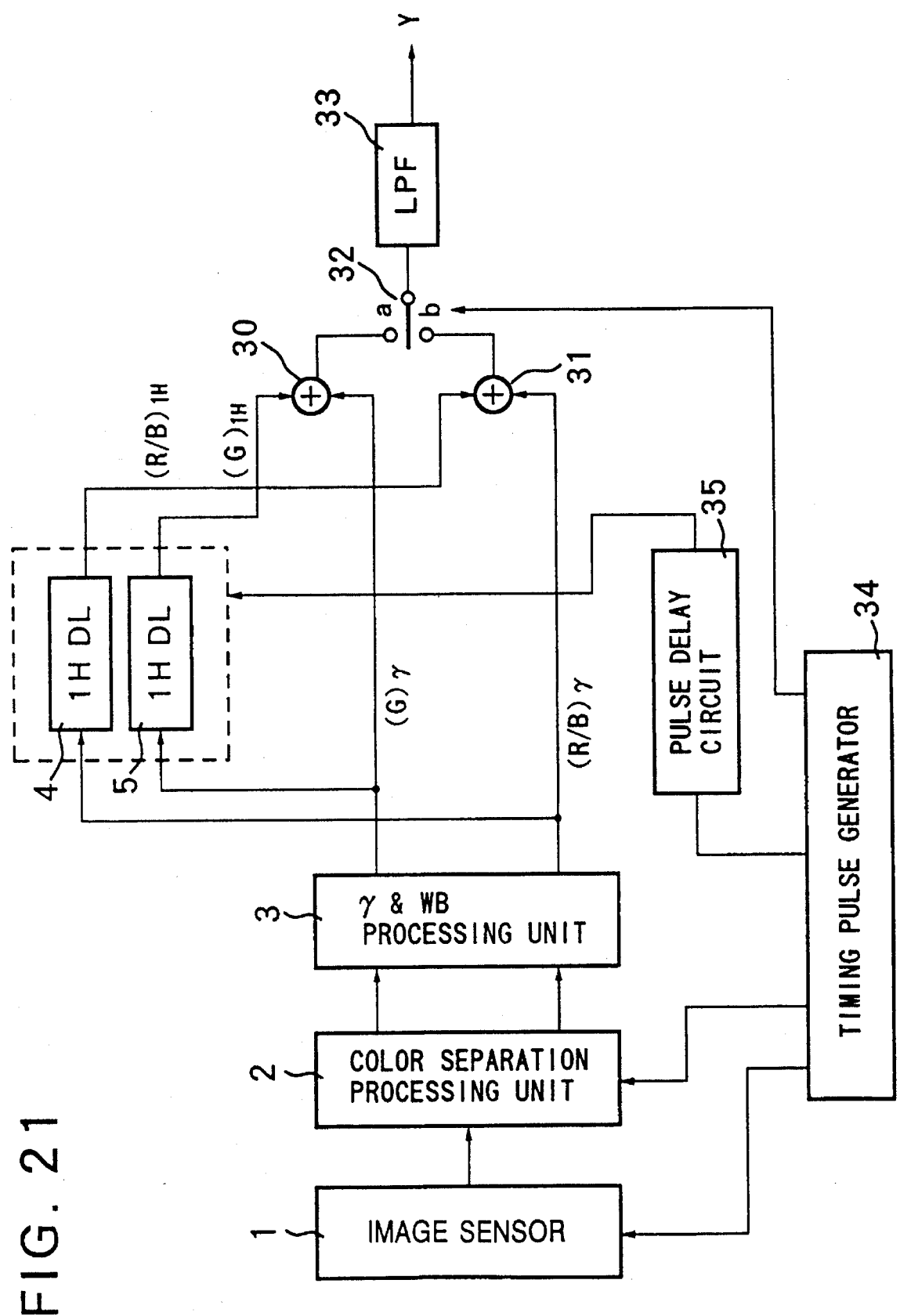
FIG. 21 is a block diagram showing an arrangement of a signal processing circuit of an image pickup apparatus according to the tenth embodiment of the present invention.

FIG. 21 is a block diagram showing an arrangement of a signal processing circuit of an image pickup apparatus according to the tenth embodiment of the present invention. The same reference numerals as in FIG. 4 denote the same parts in FIG. 21, and a detailed description thereof will be omitted.

Referring to FIG. 21, reference numeral 1 denotes an image sensor such as a CCD; 2, a color separation processing unit for color-separating an output from the image sensor 1 in units of colors; 3, a γ & WB processing unit for performing gamma processing and white balance processing of the color-separated video signal components; 4 and 5, CCD drive type 1H delay lines (1HDLs) serving as delay means for delaying the video signal by one horizontal period; 30 and 31, adders for adding signals; 32, a switch; 33, a low-pass filter (LPF); and 34, a timing pulse generator for generating timing pulses required in the image sensor 1, the color separation processing unit 2, the 1HDLs 4 and 5, and the switch 32. Reference numeral 35 denotes a pulse delay circuit as the characteristic feature of this embodiment.

In the signal processing described with reference to the conventional problems, since a phase difference is present between the 1HDL transfer pulse and the 1HDL output, B pixel information is a sum of two pixels due to the phase relationship between 1HLD outputs G and R/B and WB processing outputs G and R/B. For this reason, image degradation in the form of a moirè occurs in outputting a luminance signal Y.

In this embodiment, the 1HDL transfer pulse is delayed by a predetermined period of time by means of the pulse delay circuit 35. The delayed pulse is then input to the 1HDLs 4 and 5, and R, B, or G pixel information need not use a sum of two pixels.

An operation of the above signal processing circuit will be described below.

Figure 22:
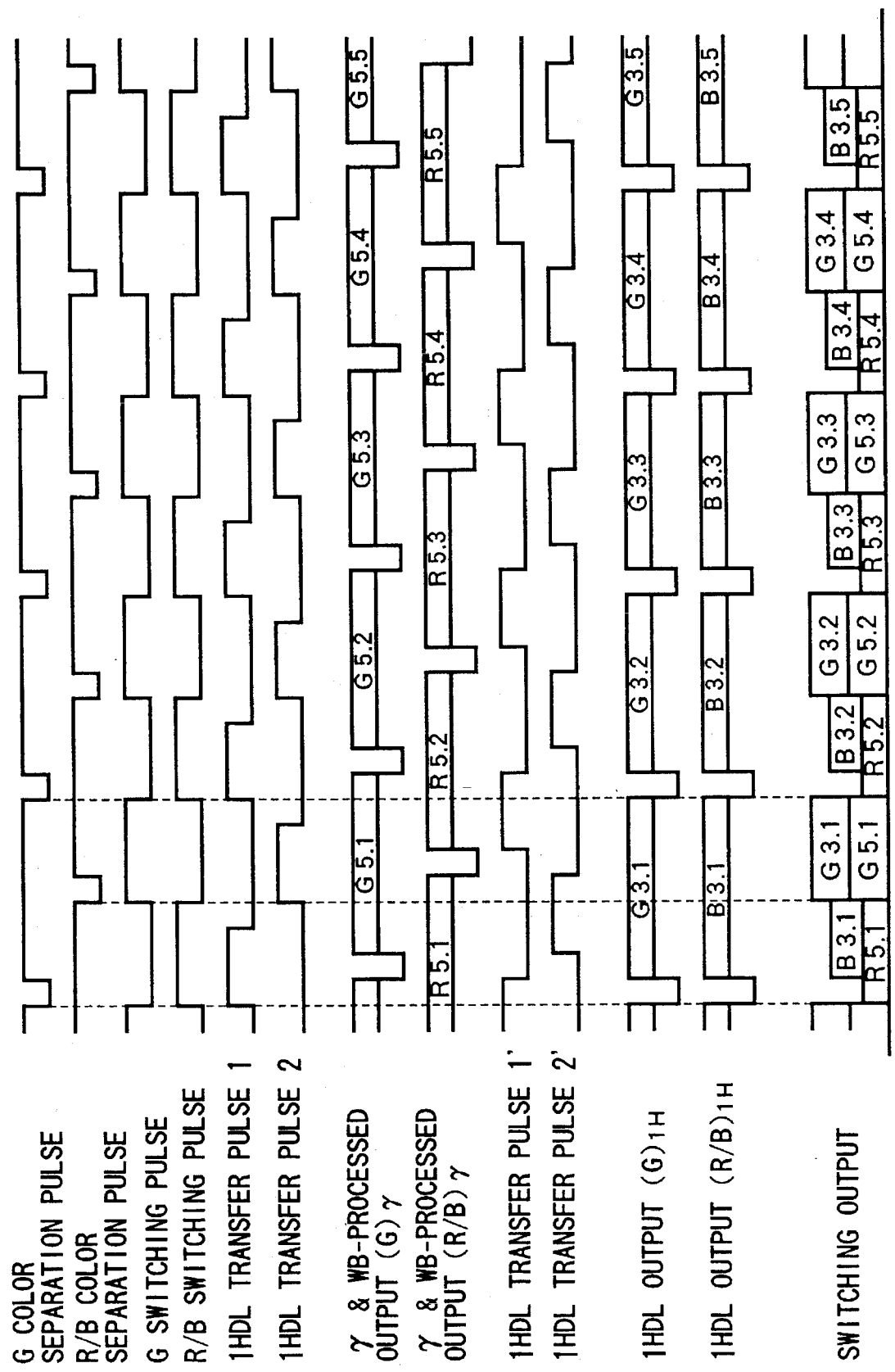
FIG. 22 is a timing chart for explaining an operation of the signal processing circuit of the tenth embodiment.

FIG. 22 is a timing chart for explaining the operation of the above signal processing circuit.

When the color filter arrangement in the image sensor 1 is given, as shown in FIG. 6, an output from the image sensor 1 is color-separated into a G signal and an R/B line sequential signal. These signals are subjected to gamma processing and white balance processing (γ & WB processing). Signals obtained upon γ & WB processing are output (G)γ and (R/B) shown in FIG. 22. Since the phases of the color separation pulses are shifted by a ½ period, as shown in FIG. 22, the phases of the γ & WB-processed outputs (G)γ and (R/B)γ are shifted by a ½ period accordingly. 1HDL outputs (G) 1H and $(R/B)_{1H}$ having a predetermined phase relationship with the transfer pulse are output. The γ & WB processed outputs (G)y and (R/B)γ and the 1HDL outputs $G_{1H}$ and $(R/B)_{1H}$ are added to each other, and the added G and R/B signals are switched and filtered through the LPF 33, thereby obtaining the luminance signal Y. When the G switching pulse is set at "H", the switch 32 in FIG. 21 is set on the a side. When the R/B switching pulse is set at "H", the switch 32 is set on the b side.

In this embodiment, 1HDL transfer clocks 1' and 2' are generated by the pulse delay circuit 35 (FIG. 21) using 1HDL transfer pulses 1 and 2. When the G signal is output by switching, the γ & WB-processed output (G)γ and the 1HDL output $(G)_{1H}$ are not added to each other by two pixels. 1HDL transfer clocks 1' and 2' are generated by the pulse delay circuit 35 using the R/B clock pulses, and addition by two pixels is prevented, thereby obtaining a luminance signal free from the moirè.

According to this embodiment, when the transfer clock output from the timing pulse generator to the 1H delay means is to be delayed to obtain a luminance signal by switching, adjacent pixel information is not mixed in the current pixel information, and image degradation such as a moirè can be suppressed.

(Eleventh Embodiment)

Figure 2:
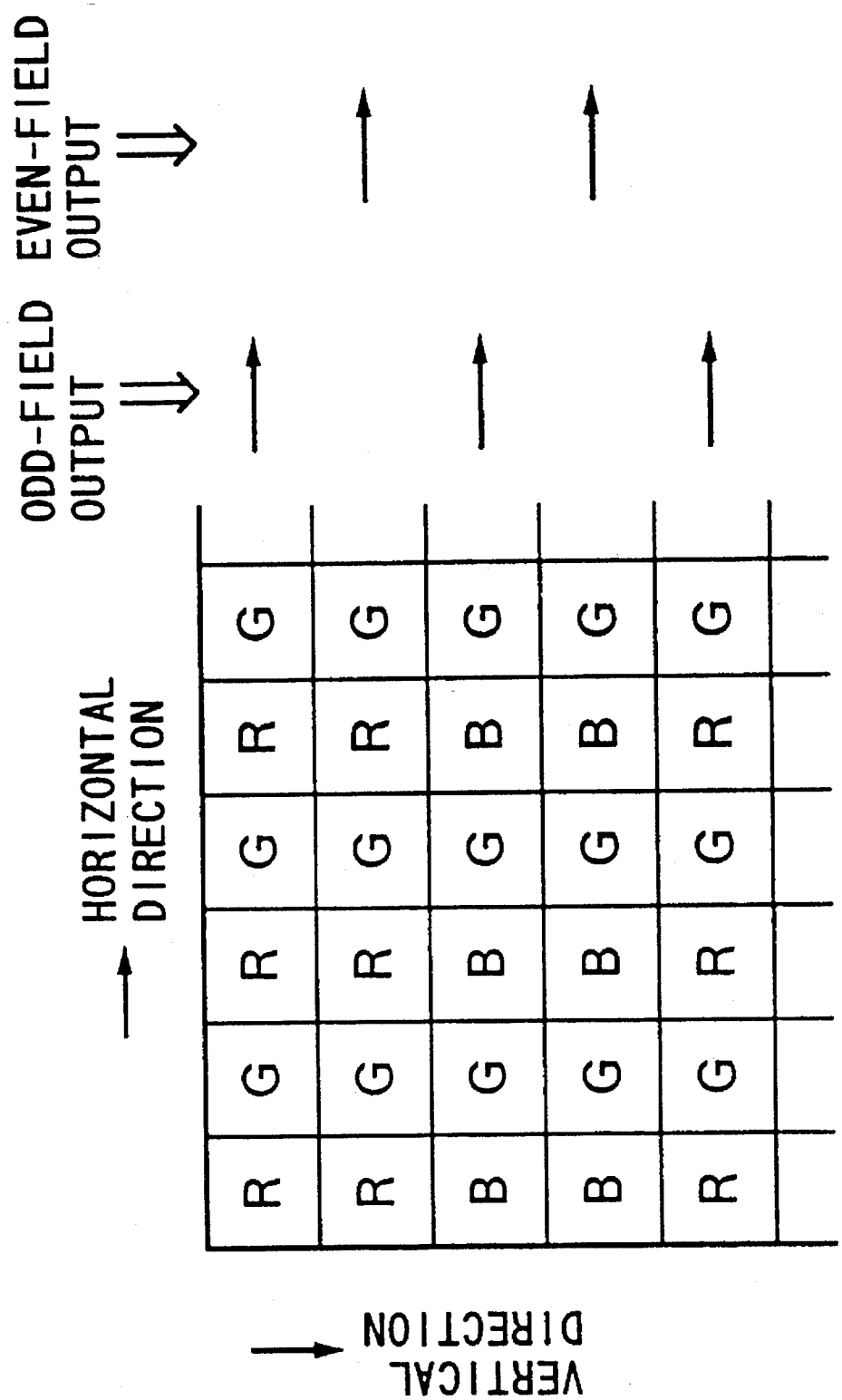
FIG. 2 is a table showing the arrangement of a color filter.
Figure 3:
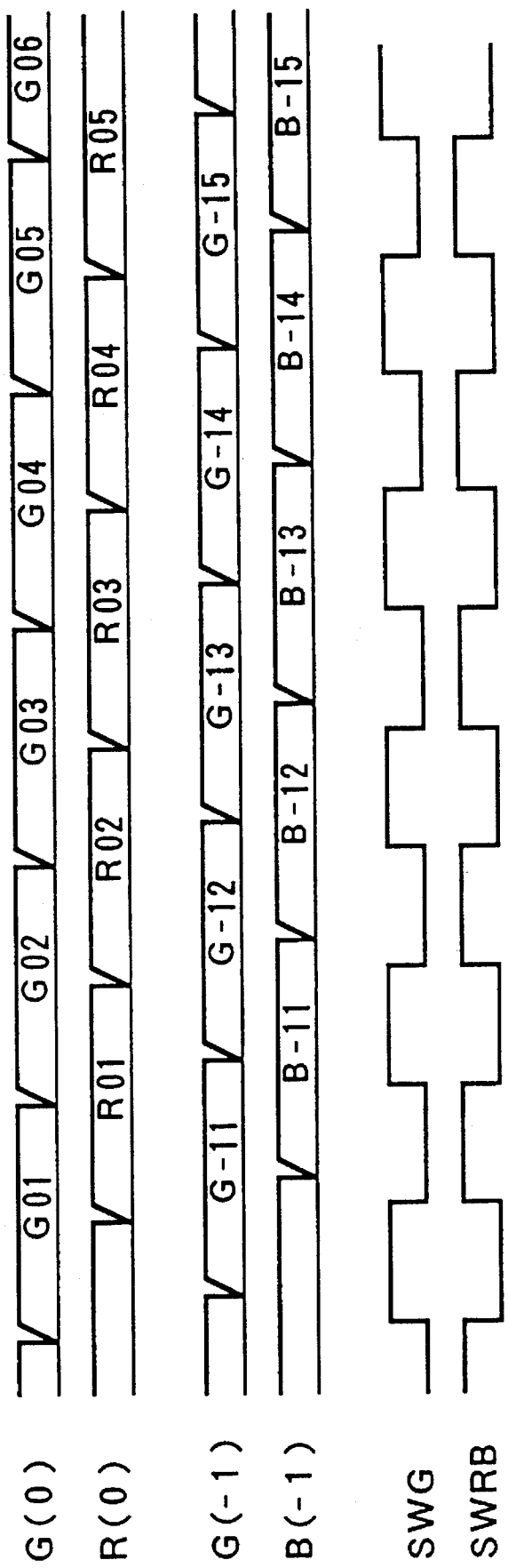
FIG. 3 is a timing chart of the conventional example.
Figure 23:
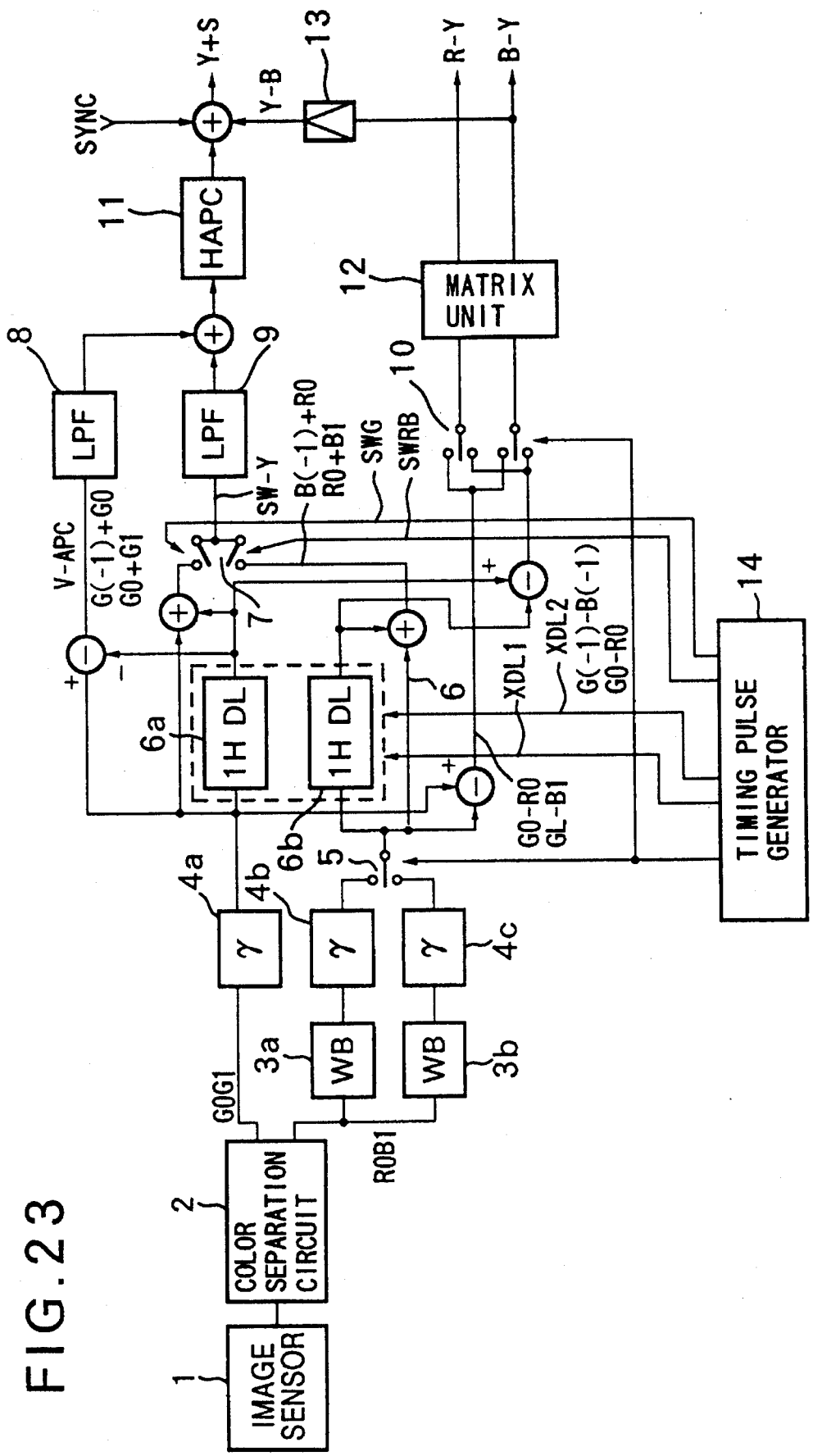
FIG. 23 is a block diagram showing an arrangement of a signal processing circuit of an image pickup apparatus according to the eleventh embodiment of the FIG. 24 is a timing chart of the eleventh embodiment.

FIG. 23 is a block diagram showing an arrangement of a signal processing circuit of an image pickup apparatus for solving the second problem as in the tenth embodiment. Referring to FIG. 23, reference numeral 1 denotes a CCD serving as an image sensor. A color filter having G stripes and R/B line sequential arrangements, as shown in FIG. 2, is used in the CCD 1. Reference numeral 2 denotes a color separation circuit for separating an output from the CCD 1 into a G signal and an R/B signal. Outputs from the color separation circuit 2 are the G signal and the R/B signal switched every 1H (line). Reference numerals 3a and 3b denote white balance circuits for correcting the white balances of the R and B components of the R/B signal; and 4a, 4b, and 4c, gamma correction circuits for performing gamma correction of the R, G, and B components. Reference numeral 5 denotes a switch for extracting properly corrected R and B signals by the R/B signal. The switch 5 is switched every line Reference numerals 6a and 6b denote CCD delay lines from which LPFs are omitted to guarantee stability of delay amounts. The gamma-corrected G signal undergoes an addition or subtraction of the 1H-delayed G(−1) signal and the non-delayed signal G(0). A difference signal between the G(−1) and G(0) signals serves as a vertical edge correction signal (V–APC). A G(−1)+G(0) signal obtained by an addition and a B(−1)+R(0) signal obtained by adding a signal B(−1) obtained by delaying the gamma-corrected R/B signal through the 1H delay line 6b and a signal R(0) obtained without delaying the gamma-corrected R/B signal through the 1H delay line 6b are switched by the switch 7 to obtain a luminance signal SW-Y. The luminance signal filtered through an LPF 9 is added to the vertical edge correction signal V-APC filtered through an LPF 8, and the resultant sum signal is corrected by an H-APC 11 serving as an edge correction circuit for performing horizontal edge correction, thereby obtaining the luminance signal Y. The luminance signal Y is added to a sync signal (SYNC) to obtain a luminance output signal Y+S.

On the other hand, as for chrominance information, R and B signals are subtracted from the G signal to obtain G-R and G-B signals. A matrix circuit 12 outputs color difference output signals R-Y and B-Y using the G-R and G-B signals. Timing pulses required in the above circuits are generated by a timing pulse generator 14.

Figure 24:
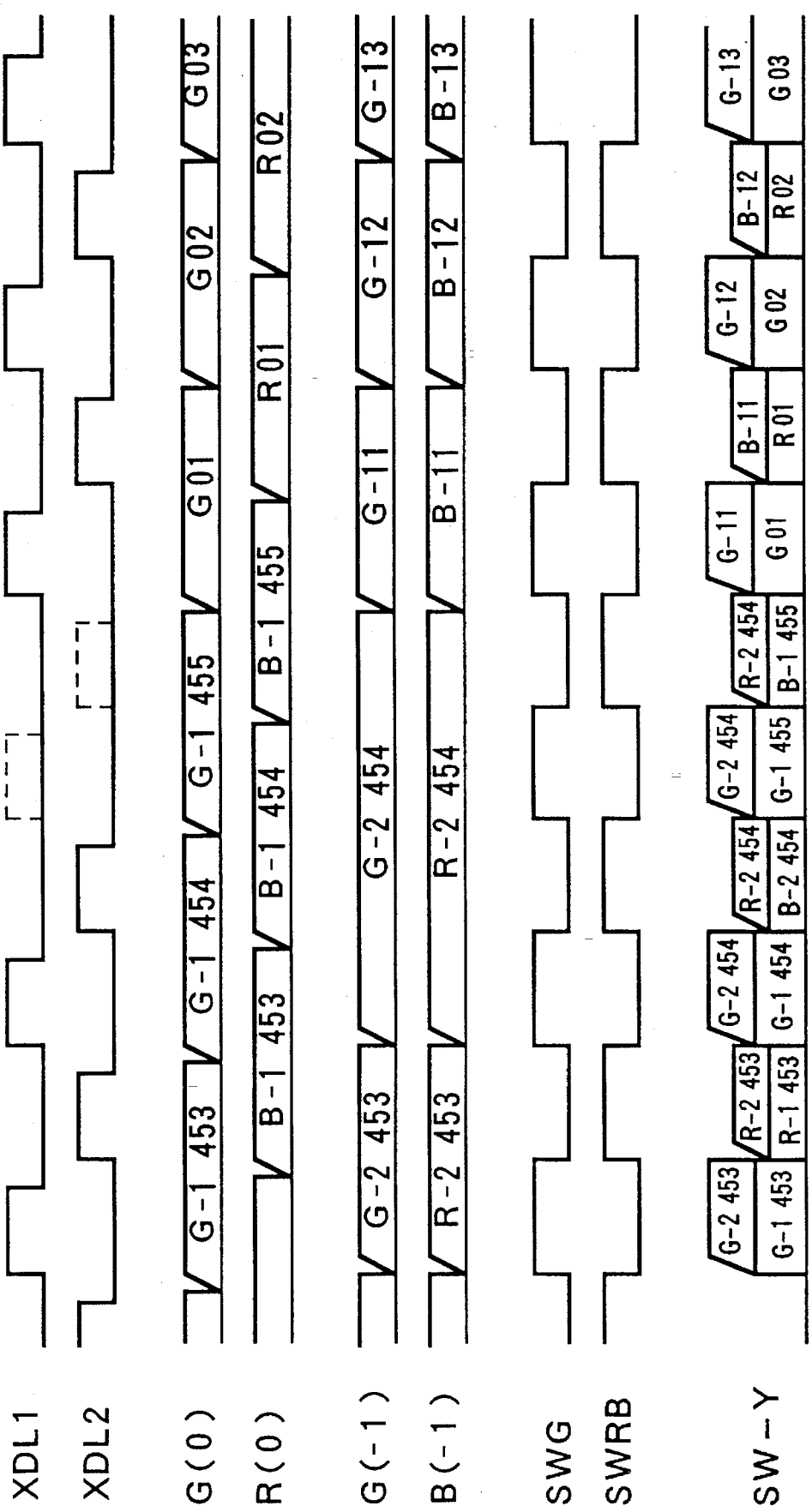
Figure 25:
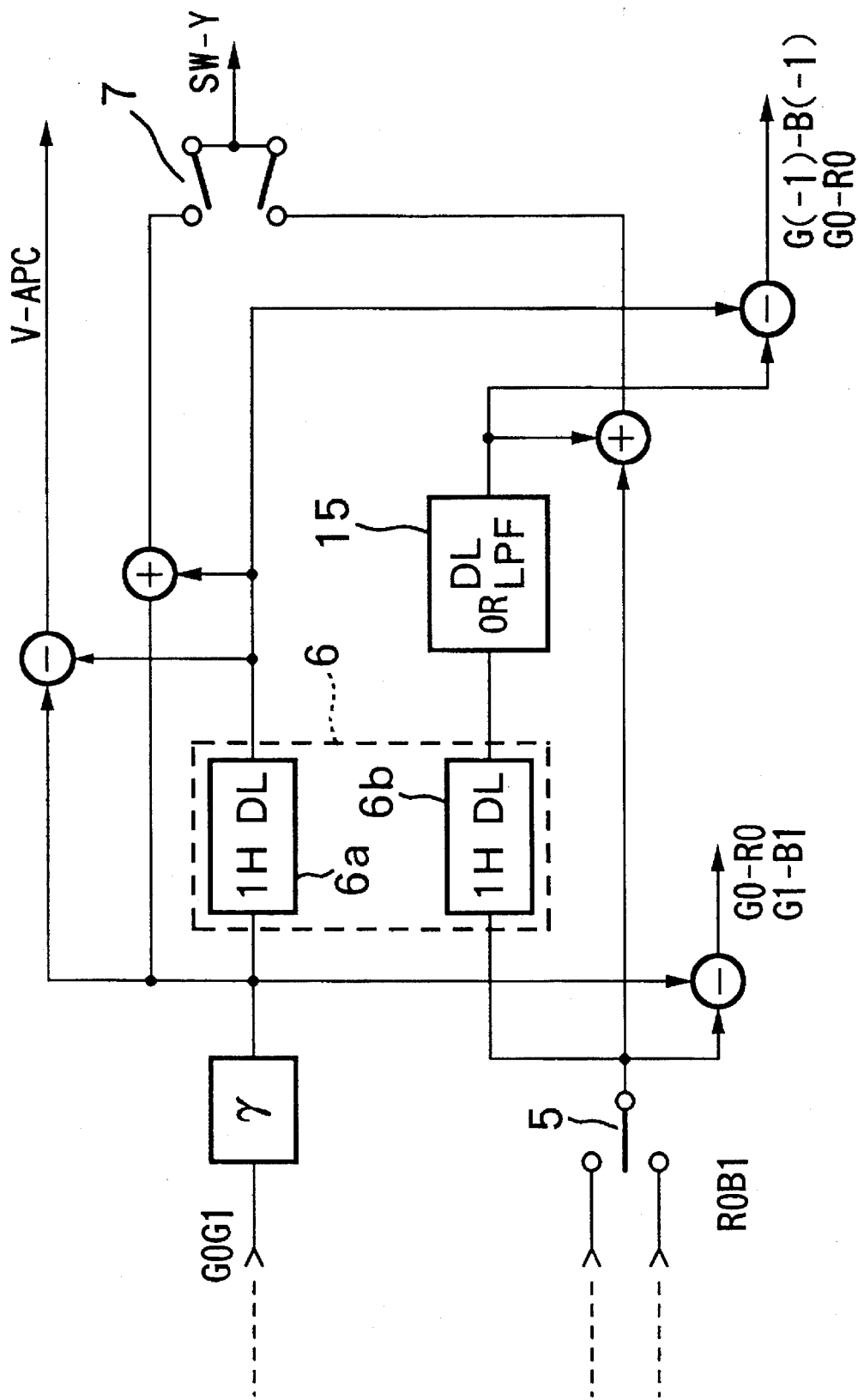
FIG. 25 is a block diagram showing a modification of the eleventh embodiment.

FIG. 24 is a timing chart showing timings between the transfer clocks of the 1H delay lines 6a and 6b FIG.23 And the input/output signal of the delay lines 6a and 6b, and between the luminance signal SW-Y and the gate pulse in the luminance signal SW-Y.

The CCD 1H delay lines 6a and 6b used in this embodiment are 456-stage analog shift registers. The transfer clock has a frequency of 7.16 MHz (one clock=1H/455) as an integer multiple of 3.58 MHz (normal frequency of the color subcarrier). Reference symbols XDL1 and XDL2 denote transfer clocks for the 1H delay lines 6a and 6b. More specifically, the transfer clock XDL1 serves as a gate hold pulse, and the transfer clock XDL2 serves as an output gate pulse. As described above, when the frequency of the transfer clock is 7.16 MHz with respect to the 454-stage CCD delay line (shift register), the delay amount is short by 1H/455 per 1H. In this embodiment, as shown in FIG. 24, pulse portions like the pulses XDL1 and XDL2 indicated by the broken lines are omitted, and the delay amount can be increased by 1H/455. When the pulse omissions are set in, e.g., a horizontal blanking period, the video signal is not adversely affected.

As described above, by controlling the transfer clocks, the delay amounts of the CCD delay lines 6a and 6b can be finely adjusted in units of clock bits. Therefore, stable phase amounts and a stable phase relationship between the switching gates SWG and SWR/B can be obtained.

A modification of this embodiment will be described below.

Figure 26:
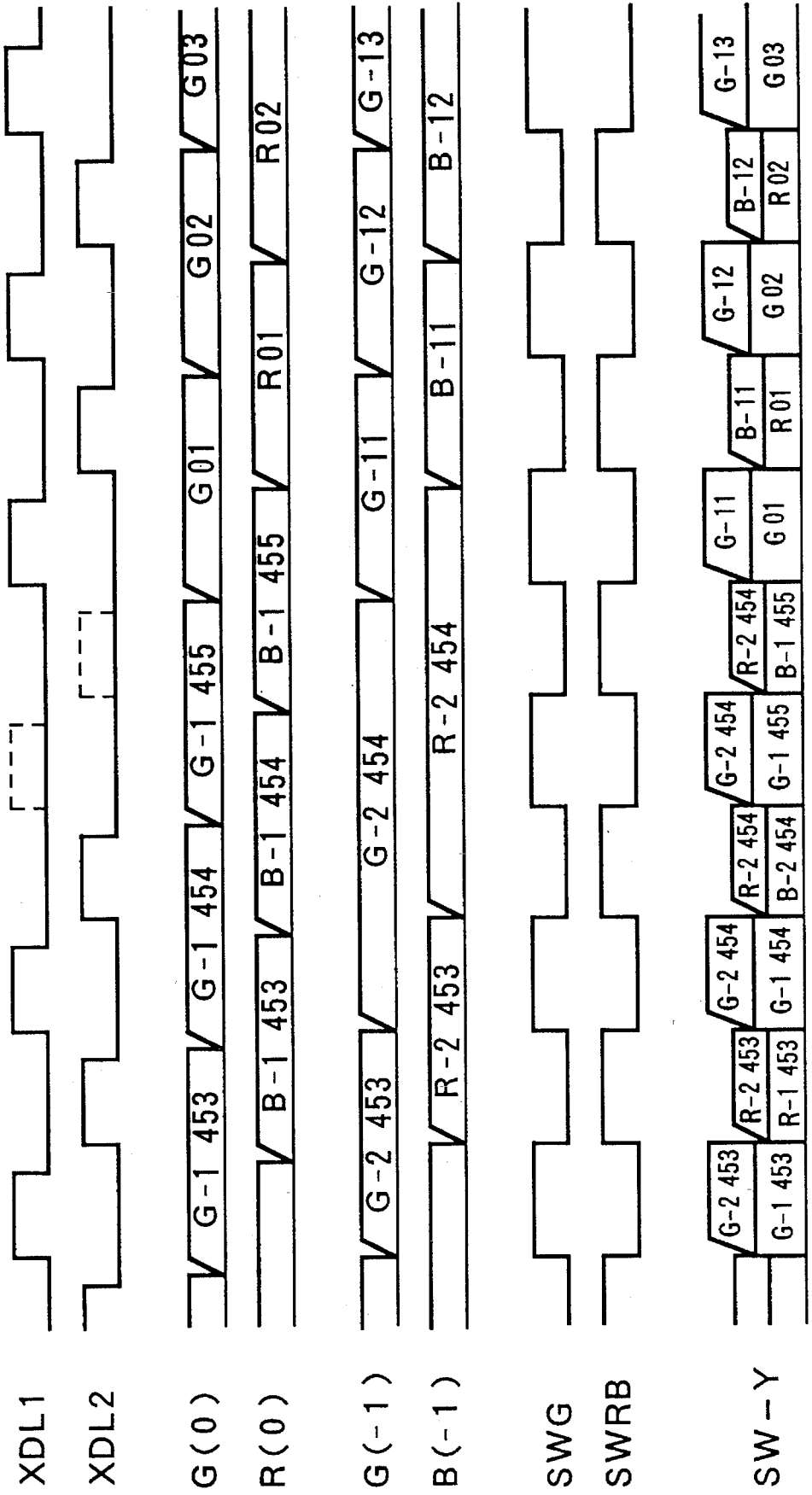
FIG. 26 is a timing chart of the modification of the eleventh embodiment.

In this modification, in an arrangement shown in 25, a delay line 15 for delaying the R/B signal by 0.5 bit, or an LPF 15 is connected to the output of the CCD 1H delay line 6b used for the R/B signal. The R/B delay amount is given as 1H, as shown in FIG. 26. As for the luminance signal SW-Y, since the 1H-delayed G and R/B signals and the non-delayed G and R/B signals are gated at the same timings, the delay amount must be accurately 1H. This can be achieved for the G signal. However, the delay amount of the R/B CCD delay line is short by 0.5 bit. However, an accurate 1H delay can be achieved by the above technique, thereby preventing degradation of the resolution.

The above arrangement is the CCD 1H delay unit in the image pickup apparatus. The present invention is not limited to this. The present invention can be embodied in a delay unit used in an apparatus except for the image pickup apparatus. In addition, the present invention can also be embodied in a charge transfer element such as a BBD.

As has been described above, according to this embodiment, the delay amount can be finely adjusted using a clock having a defined frequency, thereby obtaining a predetermined stable delay amount.

The present invention is not limited to the above embodiments and various changes and modifications can be made within the spirit and scope of the present invention. Therefore, to apprise the public of the scope of the present invention the following claims are made.

What is claimed is:

1. An image pickup apparatus having image pickup means for photoelectrically converting an object image into a first image signal and a second image signal, first delay means for delaying the first image signal, and second delay means for delaying the second image signal, wherein the first image signal and the second image signal respectively include a clock leakage component caused by clock pulses for driving said first delay means and said second delay means characterized by:

level adjusting means for adjusting a level of the first image signal, whereby a level difference between output signals from said first delay means and said second delay means caused by said clock pulses for driving said first delay means and said second delay means is reduced relative to an unadjusted level thereof.

2. The apparatus according to claim 1, wherein an adjustment amount of the level difference between output signals by said level adjusting means is set variable in accordance with a level of the first image signal.

3. The image pickup apparatus according to claim 1, wherein said level adjusting means adjusts the level of the first image signal to be input into said first delay means.

4. The image pickup apparatus according to claim 1, wherein said level adjusting means has detecting means for detecting a clock leakage component level of the first image signal, and wherein said level adjusting means adjusts the level of the first image signal in accordance with the detected clock leakage component level of the first image signal.

5. The image pickup apparatus according to claim 4, wherein said detecting means comprises a low-pass filter.

6. The image pickup apparatus according to claim 1, wherein said level adjusting means subtracts a blanking pulse having a predetermined level from the first image signal and applies the subtracted signal to said first delay means.

7. The image pickup apparatus according to claim 1, wherein said level adjusting means has detecting means for detecting a difference of clock leakage component level between the first and second image signals, said level adjusting means adjusting the level of the first image signal in accordance with the detected difference of clock leakage component level.

8. An image pickup apparatus having image pickup means for photoelectrically converting an object image into a video signal and a plurality of delay means each for delaying the video signal by a predetermined period, wherein the video signal includes a clock leakage component, characterized by:

correcting means for correcting the video signal, after it is delayed by said delay means, by a clock signal having the same period and the same phase as those of the clock leakage component included in the video signal.

9. The apparatus according to claim 8, wherein a correction mount of the video signal by said correcting means is set variable in accordance with a level of the video signal.

10. An image signal processing apparatus comprising:

first delay means for delaying a first image signal;

second delay means for delaying a second image signal;

detecting means for detecting a level difference between output signals of said first delay means and said second delay means, caused by clock pulses for driving said first delay means and said second delay means; and level adjusting means for adjusting a level of the first image signal, so that the level difference between output signals of said first delay means and said second delay means caused by said clock pulses for driving said first delay means and said second delay means is reduced relative to an unadjusted level thereof.

11. The image signal processing apparatus according to claim 10, wherein the first image signal comprises a color signal.

12. The image signal processing apparatus according to claim 10, wherein the second image signal comprises a color signal.

13. The image signal processing apparatus according to claim 10, wherein said level adjusting means adjusts the level of the first image signal to be input into said first delay means.

14. The image signal processing apparatus according to claim 10, wherein said level adjusting means has detecting means for detecting a clock leakage component level of the first image signal, and wherein said level adjusting means adjusts the level of the first image signal in accordance with the detected clock leakage component level.

15. The image signal processing apparatus according to claim 14, wherein said detecting means comprises a low-pass filter.

16. The image signal processing apparatus according to claim 10, wherein said level adjusting means subtracts a blanking pulse having a predetermined level from the first image signal and applies the subtracted signal to said first delay means.

17. The image pickup apparatus according to claim 10, wherein said level adjusting means has detecting means for detecting a difference of clock leakage component level between the first and second image signals, said level adjusting means adjusting the level of the first image signal in accordance with the detected difference of clock leakage component level.

* * * * *